(12) United States Patent
Roelse

(10) Patent No.: US 9,402,108 B2
(45) Date of Patent: Jul. 26, 2016

(54) RECEIVER SOFTWARE PROTECTION

(75) Inventor: Peter Roelse, Hoofddorp (NL)

(73) Assignee: Irdeto B.V., Hoofddorp (NL)

( * ) Notice: Subject to any disclaimer, the term of this patent is extended or adjusted under 35 U.S.C. 154(b) by 153 days.

(21) Appl. No.: 14/128,452

(22) PCT Filed: Jun. 21, 2012

(86) PCT No.: PCT/EP2012/061946
§ 371 (c)(1),
(2), (4) Date: Apr. 18, 2014

(87) PCT Pub. No.: WO2012/175600
PCT Pub. Date: Dec. 27, 2012

(65) Prior Publication Data
US 2015/0010151 A1    Jan. 8, 2015

(30) Foreign Application Priority Data

Jun. 21, 2011   (GB) .................................. 1110492.4

(51) Int. Cl.
*H04L 29/00*  (2006.01)
*H04N 21/647* (2011.01)
(Continued)

(52) U.S. Cl.
CPC .......... *H04N 21/64715* (2013.01); *G06F 21/10* (2013.01); *G06F 21/62* (2013.01); *H04L 9/14* (2013.01); *H04L 63/0428* (2013.01); *H04L 63/0442* (2013.01); *H04L 63/06* (2013.01);
(Continued)

(58) Field of Classification Search
CPC ............................................. G06F 2221/2141

USPC .................. 380/200–210, 239–242, 377–30; 726/26–33; 705/50–59
See application file for complete search history.

(56) References Cited

U.S. PATENT DOCUMENTS 6,252,964 B1   6/2001   Wasilewski
8,538,887 B2 *  9/2013   Yoshino .................. G06F 21/10
                                                      705/50
(Continued)

FOREIGN PATENT DOCUMENTS

| EP | 2461534 A1 | 6/2012 |
| EP | 2461564 A1 | 6/2012 |
| GB | 2417652 A  | 3/2006 |

OTHER PUBLICATIONS

International Search Report and Written Opinion cited in corresponding International Application No. PCT/EP2012/061946 dated Jul. 30, 2012.

(Continued)

*Primary Examiner* — Madhuri Herzog
(74) *Attorney, Agent, or Firm* — Marc S. Kaufman; Amardeep S. Grewal; Reed Smith LLP

(57) ABSTRACT

A method of obtaining descrambling information at a receiver, the descrambling information for enabling descrambling of scrambled content. A provider verification key is used to access a software image, which has been secured by a provider using a provider signature key corresponding to the provider verification key. A secured version of the descrambling information is received. The accessed software image is used to obtain virtual descrambling information from the secured version of the descrambling information and is provided as inputs to a cryptographic function to produce a given output comprising said descrambling information.

14 Claims, 21 Drawing Sheets

(51) Int. Cl.
  H04L 29/06      (2006.01)
  G06F 21/62      (2013.01)
  H04N 21/266     (2011.01)
  H04N 21/235     (2011.01)
  H04N 21/435     (2011.01)
  H04N 21/81      (2011.01)
  G06F 21/10      (2013.01)
  H04L 9/14       (2006.01)

(52) U.S. Cl.
  CPC .......... *H04L 63/062* (2013.01); *H04N 21/2351* (2013.01); *H04N 21/26613* (2013.01); *H04N 21/4353* (2013.01); *H04N 21/8166* (2013.01); *G06F 2221/2141* (2013.01); *H04L 2209/24* (2013.01)

(56) References Cited

U.S. PATENT DOCUMENTS

| | | | | |
|---|---|---|---|---|
| 2001/0001014 A1* | 5/2001 | Akins, III | ........ | H04N 21/63345 380/241 |
| 2002/0025045 A1* | 2/2002 | Raike | ................ | H04L 63/0442 380/280 |
| 2006/0168451 A1* | 7/2006 | Ishibashi | ................ | G06F 21/10 713/176 |
| 2006/0179489 A1* | 8/2006 | Mas Ribes | ............ | H04N 5/913 726/27 |
| 2006/0210082 A1* | 9/2006 | Devadas | ................ | G06F 21/31 380/277 |
| 2007/0180464 A1* | 8/2007 | Dellow | ................ | H04N 7/1675 725/31 |

OTHER PUBLICATIONS

Costa L C P et al.: "Over the air download for digital television receivers upgrade", IEEE Transactions on Consumer Electronics, IEE Service Center, New York, NY, US vol. 53, No. 1, Feb. 1, 2010.

Guillou L C et al: "Encipherment and Conditional Access" SMPTE—Motion Imaging Journal, Society of Motion Picture and Television Engineers, White Plains, NY, US, vol. 103, No. 6, Jun. 1, 1994.

* cited by examiner

RECEIVER SOFTWARE PROTECTION

This application claims priority to International Patent Application No. PCT/EP2012/061946, filed Jun. 21, 2012, which claims priority to GB 1110492.4, filed Jun. 21, 2011, the disclosures of which are hereby incorporated herein by reference in their entirety.

FIELD OF THE INVENTION

Embodiments relate to methods and apparatus for obtaining descrambling information at a receiver. The embodiments also relate to methods and apparatus for enabling a receiver to obtain descrambling information.

Conditional access/digital rights management (CA/DRM) systems for digital video broadcast (DVB) transmissions are well known and widely used in conjunction with pay television (TV) services. Such systems provide secure transmission of a broadcast stream comprising one or more services to a digital receiver contained for example in a set-top box or a mobile terminal supporting broadcast services. To protect the broadcast services from unauthorized viewing, the data packets are scrambled (encrypted) at the transmitter side with an encryption key commonly referred to as a control word. A CA/DRM system implements the selective distribution of the control words to authorized receivers only. Further security is provided by periodically changing the control words so they are only valid for a certain period. Typically control words are transmitted in encrypted form to the receiver using so-called entitlement control messages (ECMs).

In the receiver an ECM is filtered out of a transport stream and sent to a secure computing environment, referred to as a CA/DRM client (e.g., a CA/DRM client can be a smart card with embedded software or it can be a (possibly obfuscated) software module executed inside the receiver). The CA/DRM client subsequently decrypts the ECM using a higher-level key, which is common to all CA/DRM clients that are authorized to access the TV channels associated with the control words included in the ECM. The control word is returned to the receiver, which loads the control word into the descrambler for descrambling data.

Control word piracy is a significant problem in digital video broadcasting (DVB) systems. A common attack uses the fact that a control word is a shared key that unlocks content on all receivers. An adversary can break part of the key delivery infrastructure to obtain control words and re-distribute the control words to unauthorized receivers. For instance, sometimes adversaries are able to intercept a control word that is transmitted from the CA/DRM client to the descrambler in the receiver and re-distribute it over local networks or over the internet. The re-distributed control word is then used to descramble the scrambled services without a legitimate authorized CA/DRM client. A security requirement is therefore that the confidentiality and the authenticity of a control word shall be protected.

In some cases, a chip set supports a key hierarchy to secure the control word delivery based on secret keys installed during the manufacturing process. FIG. 1 of the accompanying drawings shows a conventional example of chip set 102 of a receiver to load keys to descramble content. Decryption modules 114, 116 and 118 use encrypted input data and an input key to obtain decrypted output data. The chip manufacturer personalizes the chip set with a pseudo-random secret value for the symmetric chip set unique key CSUK and assigns a non-secret chip set serial number CSSN to the chip set for future identification. Elements 104 and 106 are read-only memory locations, for storing CSSN and CSUK, respectively. Elements 108 and 110 are read-and-write memory locations for temporary storing decrypted output data. As shown, content decoder 112 decodes the descrambled content. Dataflows between elements are indicated by arrows. Labels along the arrows identify the dataflows.

As shown in FIG. 1, a content stream scrambled with control word CW, denoted by $\{Content\}_{CW}$, is received in the chip set 102. To provide the control word needed to descramble the content, chip set 102 supports secure loading of the associated CW using input $\{CW\}_{CSLK}$, which denotes the CW encrypted with a symmetric chip set load key CSLK. Said CSLK is received at chip set 102 encrypted with the symmetric chip set unique key CSUK, which is denoted by input $\{CSLK\}_{CSUK}$. To decrypt $\{CSLK\}_{CSUK}$, CSUK is needed. The CSUK and the chip set serial number CSSN associated with the particular chip set are typically pre-installed in memory locations on the chip set (element 104 and element 106, respectively) and cannot be altered. In operation, CSUK is retrieved from secured storage (i.e., element 106) in chip set 102 and is used to decrypt the CSLK from $\{CSLK\}_{CSUK}$ using decryption module 114. Once decrypted, CSLK is stored in memory (i.e., element 108), and can be used to decrypt $\{CW\}_{CSLK}$ using decryption module 116. Lastly, the clear control word stored in memory (i.e., element 110) is used by decryption module 118 to descramble incoming scrambled content $\{Content\}_{CW}$, such that the content may be decoded by the chip set using content decoder 112. Content decoder 112 can be external to the chip set 102 and is typically a part of the receiver.

Typically, for vertical market receivers, a chip manufacturer supplies a list of (CSSN, CSUK) pairs to a CA/DRM supplier, enabling the loading of a value for the chip set load key CSLK into a chip set, using the method depicted in FIG. 1. Known conditional access systems use a key loading mechanism, such as shown in FIG. 1, by sending an entitlement management message (EMM) and an ECM from a head-end system to the CA/DRM client. For the example in FIG. 1, the EMM includes the CSLK (intended for the CA/DRM client, and protected using the confidential and authentic channel offered by the CA/DRM system) and its encrypted version $\{CSLK\}_{CSUK}$ (intended for the chip set 102). The ECM includes an encrypted CW. The CA/DRM client provides $\{CSLK\}_{CSUK}$ to the chip set and may use the CSLK as a key for loading a sequence of control words. That is, the CA/DRM client may use CSLK to re-encrypt a CW included in an ECM, resulting in a message $\{CW\}_{CSLK}$ that is sent to the chip set 102. Typically, CSLK is unique to a particular combination of CA/DRM client and chip set, and consequently, only that chip set can decrypt $\{CW\}_{CSLK}$ received from the CA/DRM client (so sharing a CW loading message $\{CW\}_{CSLK}$ is not possible).

For horizontal market receivers, a CA/DRM system operator (also referred to as a provider or an operator throughout this document) shall be able to swap a CA/DRM system. In the solution described above for vertical market receivers, the secret master key associated with the receiver (that is, the key CSUK) is known to a CA/DRM supplier. From a security perspective, this property is undesirable for horizontal market receivers. A reason for this is that the current CA/DRM supplier may publish the secret master key CSUK after the CA/DRM system has been swapped, compromising the security of the receiver. A security requirement for horizontal receivers is therefore that the scheme shall not require that any of the receiver's secrets known to a CA/DRM supplier need to be known to any other CA/DRM supplier. This requirement is not satisfied in the scheme described above.

While the example in FIG. 1 depicts a method that uses symmetric cryptographic algorithms, it is also possible to use asymmetric, or public-key, cryptography as shown in FIG. 2 of the accompanying drawings.

FIG. 2 shows a typical chip set implementing the loading of a control word using an asymmetric cryptographic algorithm to protect the confidentiality of the control word. Chip set 202, associated with chip set serial number CSSN includes element 204 (read-only memory storage location), element 208 and element 210 for storing a key pair (read-and-write memory storage locations), and element 212 for temporarily storing a clear control word (read-and-write memory location). To protect the authenticity of the key pair, preferably element 208 and element 210 are write-once memory locations.

Instead of loading a pair (CSSN, CSUK) during manufacturing and sending the pairs to the CA/DRM suppliers and their operators (as performed in the example shown in FIG. 1), the chip manufacturer of chip set 202 shown in FIG. 2 personalizes chip set 202 by activating key pair personalization module 206 that generates a random key pair consisting of a chip set public key CSPK and a chip set secret key CSSK. The CSPK and CSSK are stored in elements 208 and 210, respectively. Alternatively, the key pair personalization module 206 may be implemented outside the chip set 202 (e.g., in a chip set personalization system available to the chip set manufacturer), and the manufacturer may load CSSK into the chip set 202 during its personalization. After this, the manufacturer can delete CSSK from its system(s).

The manufacturer maintains pairs of numbers, each pair comprising of a chip set serial number CSSN and its associated chip set public key CSPK. The list of (CSSN, CSPK) pairs can be made available to all CA/DRM suppliers. Notice that only the authenticity of these pairs needs to be protected, as the numbers CSSN and CSPK are not secret. The CSPK is used to encrypt a CW that only the receiver with the corresponding CSSK can decrypt (using decryption module 216). That is, the encrypted control word $\{CW\}_{CSPK}$ is a unique data pattern as no other receiver will generate the same random key pair (CSPK, CSSK), so sharing a CW loading message $\{CW\}_{CSPK}$ is not possible. The decrypted CW, stored temporarily in element 212 is then used to decrypt $\{Content\}_{CW}$ by decryption module 218 to produce the descrambled content. The descrambled content is then subsequently decoded using content decoder 214.

The benefit of the public-key solution depicted as in FIG. 2 is that the chip set secret key CSSK does not need to be known to any CA/DRM supplier. However, as CSPK is a public key, it is also available to an adversary. In particular, an adversary can use a CSPK to distribute a given control word CW to the receiver associated with that CSPK, e.g., after CW is compromised from another receiver. That is, this method does not protect the authenticity of a CW loading message.

A second, independent mechanism for protecting the authenticity of a CW loading message may be added to the public-key solution depicted in FIG. 2. For instance, a message authentication code (MAC) can be used to protect the authenticity of a CW loading message $\{CW\}_{CSPK}$. A MAC is a symmetric cryptographic technique, based on a secret key $K_{MAC}$ shared between the CA/DRM client and the chip set. In particular, the CA/DRM client uses $K_{MAC}$ as a key to generate a MAC value of a CW loading message $\{CW\}_{CSPK}$. The computed MAC value can be appended to the message. After receiving the message and the MAC value, the chip set uses $K_{MAC}$ to verify the MAC value. Alternatively, a method based on public-key cryptography (i.e., an asymmetric digital signature) can be used for protecting the authenticity of a CW loading message $\{CW\}_{CSPK}$. In such a solution, the manufacturer loads a public key associated with a digital signature scheme into the receiver during the personalization phase. This public key can be used as a root key of an authenticity mechanism. The receiver can use the authenticity mechanism to verify the authenticity of a CW loading message $\{CW\}_{CSPK}$.

However, for both authenticity schemes (symmetric and asymmetric), the master key used for signing a message is a secret key. This implies that the requirement that the scheme shall not require that any of the receiver's secrets known to a CA/DRM supplier need to be known to any other CA/DRM supplier is not satisfied if this master key is distributed to a CA/DRM supplier.

To fulfil this requirement and to protect the confidentiality and authenticity of a control word, the role of the chip manufacturer as a trusted party can be extended (or an additional trusted party can be used). For example, an additional key layer can be introduced in both schemes, and the trusted party can manage the root keys of such a scheme. However, this implies that the trusted party needs to manage (at least) one secret associated with a receiver after its personalization is completed. For liability reasons, this role of the trusted party is not desirable for chip set manufacturers. This implies that an additional trusted party would be needed.

EP10193312.5 discloses a scheme with the following properties: (i) the confidentiality and the authenticity of a CW are protected (ii) CA/DRM systems can use the scheme independently without the need to share a secret key, and (iii) after the personalization of a receiver, the trusted party no longer needs to manage any secret keys associated with the receiver (chip set).

As mentioned, in a pay-TV system, a CA/DRM client is implemented inside a receiver (or as a module/device coupled to the receiver). The CA/DRM client processes EMMs and ECMs, thereby controlling the access to digital content. The CA/DRM client can be implemented inside a detachable security module such as a smart card integrated circuit or it can be implemented in (possibly obfuscated) software and executed on a chip in the receiver. If the CA/DRM client is implemented in software and executed on a chip in the receiver, then typically the CA/DRM client is included in the receiver software image. The receiver software image is usually not executed on the chip set of the receiver, but on a separate chip or circuit integrated in the receiver.

In practice, the receiver software image can be updated (1) to enhance the receiver's functionality, (2) to correct a security breach (e.g., by including updated CA/DRM client software in the updated software image), (3) to swap the CA/DRM system (assuming the CA/DRM client is implemented in software and included in the receiver software image) or (4) to download a receiver software image of a new provider (i.e., a new CA/DRM system operator) into a horizontal market receiver if the receiver is to be used in the operation of the new provider. A common security requirement for a software download (possibly including an updated or new CA/DRM client) is that the authenticity or the single source authenticity of the software image shall be protected. Notice that such a security measure prevents that a compliant receiver accepts an illegal software image, possibly including a modified CA/DRM client. In particular, a modified CA/DRM client may be used to illegally access content, e.g., by circumventing content usage rules (such as circumventing a content usage rule that would otherwise restrict the access to content for a specific amount of time) or by obtaining compromised keys (such as control words) from an unauthorized source.

Well-known techniques for protecting the authenticity or the single source authenticity of a software image are the use of a symmetric MAC or an asymmetric digital signature, respectively. More precisely, if such a technique is used, then a MAC value or a digital signature for the software image (or a cryptographic hash value thereof) is generated, and the generated MAC value or digital signature is appended to the software image. Next, after downloading the software image and the MAC value or the digital signature, the receiver can use a verification key and an associated verification algorithm to verify the authenticity or single source authenticity of the software image. In the following, the mechanism used to protect the authenticity of the software image is also referred to as the software authenticity mechanism.

Typically, for vertical market receivers, a chip set is personalized with a public key associated with a digital signature scheme to protect the authenticity of a receiver software image. The corresponding secret key is known to the CA/DRM supplier and the CA/DRM supplier uses this key for signing receiver software images. If this solution would be implemented in horizontal market receivers, then the CA/DRM supplier could publish the secret key associated with the software authenticity mechanism after the CA/DRM system has been swapped, compromising the security of the software authenticity mechanism.

An alternative solution for horizontal market receivers is to extend the role of the chip set manufacturer as a trusted party (or to use an additional trusted party). For example, the trusted party can manage the secret master key of the software authenticity mechanism. The trusted party may use this secret master key to sign receiver software images, or the trusted party may use this secret master key to sign public keys associated with CA/DRM suppliers or CA/DRM system operators, who can use their associated secret key for signing receiver software images. However, note that this implies that the trusted party needs to manage a secret associated with a receiver after its personalization is completed. For liability reasons, this role of the trusted party is not desirable for chip set manufacturers. This implies that an additional trusted party would be needed in such a solution.

BRIEF DESCRIPTION OF THE DRAWINGS

Embodiments will now be described, by way of example only, with reference to the accompanying drawings, in which.

DETAILED DESCRIPTION

Figure 1:
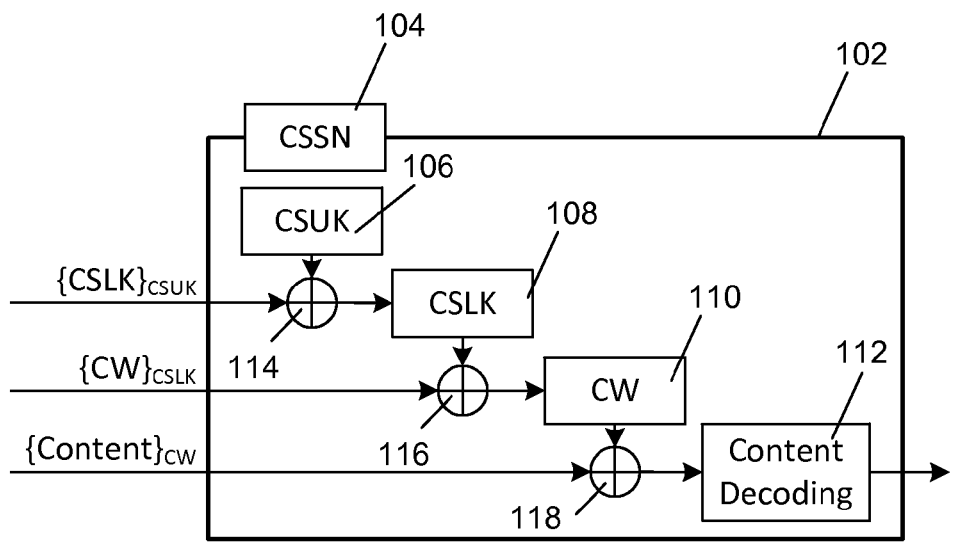
FIG. 1 schematically illustrates a prior art chip set using symmetric cryptography.
Figure 2:
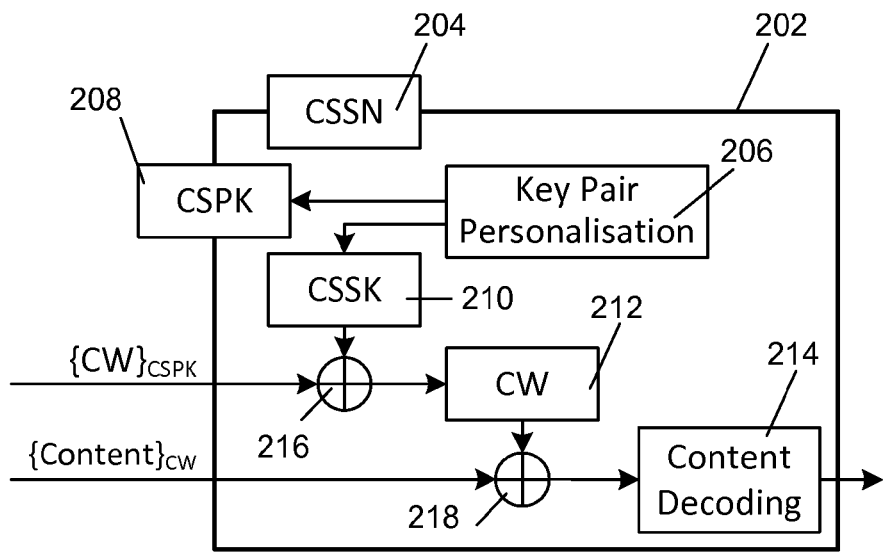
FIG. 2 schematically illustrates another prior art chip set using asymmetric cryptography.

There is a need for an improved solution for protecting the authenticity or single source authenticity of a receiver software image for horizontal market receivers. In particular, a software authenticity mechanism with the following properties is needed: (i) the authenticity or single source authenticity of the receiver software image is protected, (ii) CA/DRM systems can use the software authenticity mechanism independently without the need to share a secret key, and (iii) after the personalization of a receiver, the trusted party no longer needs to manage any secret key associated with the receiver.

According to a first embodiment, there is provided a method of obtaining descrambling information at a receiver, the descrambling information for enabling descrambling of scrambled content, the method comprising: using a provider verification key to access a software image, said software image having been secured by a provider using a provider signature key corresponding to the provider verification key; receiving a secured version of the descrambling information; using the accessed software image to obtain virtual descrambling information from the secured version of the descrambling information; providing the virtual descrambling information and said provider verification key as inputs to a cryptographic function to produce a given output comprising said descrambling information, wherein the cryptographic function has the property that it is infeasible to determine a key pair including a signature key and a verification key associated with the signature key, and another virtual descrambling information, such that the determined verification key and the another virtual descrambling information map to the given output of the cryptographic function.

In some embodiments, accessing the software image comprises verifying and/or authenticating said software image.

In some embodiments, the software image is encrypted and accessing the software image comprises: verifying and/or authenticating a decryption key for decrypting the encrypted software image; and using the verified and/or authenticated decryption key to decrypt the software image.

In some embodiments, the secured version of the descrambling information is descrambling information secured by a provider using a second provider signature key; using the software image to obtain virtual descrambling information from the secured version of the descrambling information comprises using a second provider verification key corresponding to the second provider signature key to access the secured version of the descrambling information; and said providing comprises providing the virtual descrambling information, said provider verification key and said second provider verification key as inputs to a cryptographic function to produce a given output comprising said descrambling information, wherein the cryptographic function has the property that it is infeasible to determine a first key pair including a first signature key and a first verification key associated with the first signature key, a second key pair including a second signature key and a second verification key and another virtual descrambling information, such that the determined first verification key, the determined second verification key and the another virtual descrambling information map to the given output of the cryptographic function. In this case, the second provider verification key may equal the provider verification key.

In some embodiments, a provider verification key and a provider signature key are, respectively, a public key and a private key for a digital signature scheme. Alternatively, in some embodiments, a provider verification key and a provider signature key are keys for a symmetric message authentication scheme.

According to a second embodiment, there is provided a method for enabling a receiver to obtain descrambling information, the descrambling information for enabling descrambling of scrambled content, the method comprising: providing to the receiver a provider verification key and a software image, said software image having been secured by a provider using a provider signature key corresponding to the provider verification key, said provider verification key for accessing said software image; providing to the receiver a secured version of the descrambling information, wherein said software image is arranged to obtain virtual descrambling information from the secured version of the descrambling information, wherein said receiver is arranged to execute a cryptographic function, wherein provision of the virtual descrambling information and said provider verification key as inputs to a cryptographic function produce a given output comprising said descrambling information, wherein the cryptographic function has the property that it is infeasible to determine a key pair including a signature key and a verification key associated with the signature key, and another virtual descrambling information, such that the determined verification key and the another virtual descrambling information map to the given output of the cryptographic function.

According to a third embodiment, there is provided an apparatus arranged to carry out any one of the above-mentioned methods.

When configured to carry out a method according to the embodiments, the apparatus may be a smart card or a chip set of a receiver.

When configured to carry out a method according to the embodiments, the apparatus may be a head-end system of a content delivery network.

According to a fourth embodiment, there is provided a computer program which, when executed by a processor, causes the processor to carry out any one of the above-mentioned methods.

As with the technique described in EP10193312.5, the scheme defined herein uses a function to derive a content encryption/decryption key, also referred to as a control word (CW). More precisely, the scheme disclosed in EP10193312.5 is extended, in that the (root) verification key of the software authenticity mechanism is one of the inputs to the function. The verification key may be equal to the signature verification key used to verify the authenticity of a key loading message in EP10193312.5 or it may be an additional input to the function. The output of the function includes a CW and possibly more values to be used in the content (de-)scrambling mechanism. The function is chosen in such a way that the authenticity of the verification key of the software authenticity mechanism is protected, in that content descrambling will fail if the verification key is not authentic. The corresponding signing key is used as the root key in a mechanism for protecting the authenticity or single source authenticity of a receiver software image.

In the description that follows and in the Figures, certain embodiments are described. However, it will be appreciated that the embodiment is not limited to the embodiments that are described and that some embodiments may not include all of the features that are described below. It will be evident, however, that various modifications and changes may be made herein without departing from the broader spirit and scope of the embodiment as set forth in the appended claims.

Figure 3:
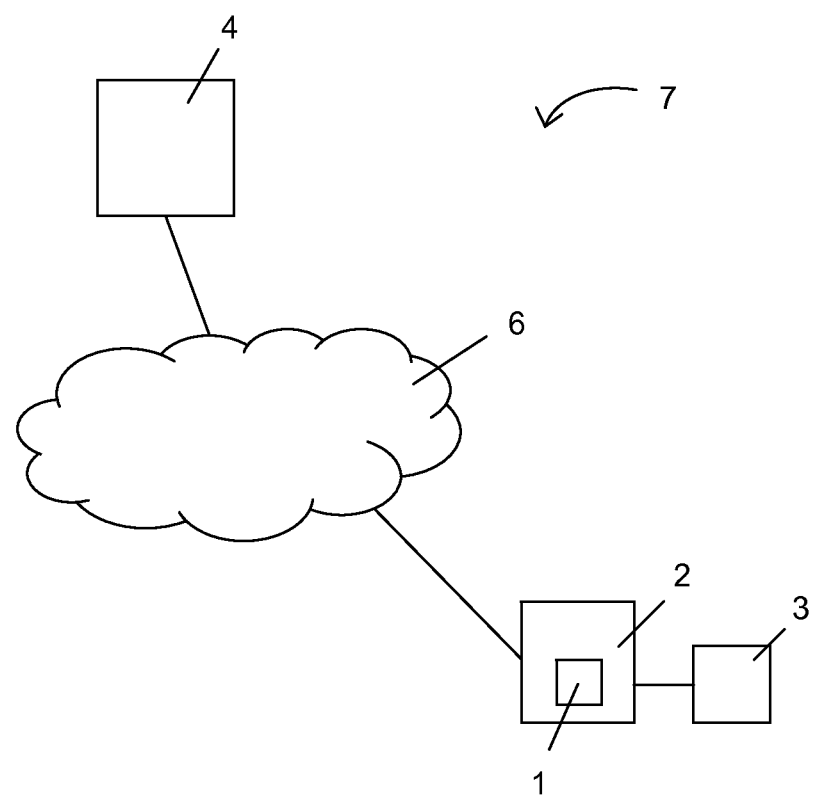
FIG. 3 schematically illustrates an exemplary system according to an embodiment.

FIG. 3 schematically illustrates an exemplary system 7 according to the embodiments. The system 7 comprises a head-end system 4 arranged to communicate with one or more receivers 2 via a distribution network 6.

The head-end system 4 transmits (or sends or communicates) a content stream scrambled using one or more control words (i.e. $\{Content\}_{CW}$) to a receiver 2 via the distribution network 6. The head-end system 4 may transmit one or more ECMs and EMMs to the receiver 2 via the distribution network 6 so that the receiver 2 can access the one or more control words and thereby descramble the scrambled content stream. It will be appreciated, however, that whilst embodiments will be described with reference to ECMs and EMMs, embodiments are not limited to making use of ECMs and EMMs. The head-end system 4 may use any methods and systems described in relation to FIGS. 5-8, 10, 11 and 14-18 to scramble the content and provide descrambling information (e.g. ECMs and EMMs) to the receiver 2.

The distribution network 6 may be any network capable of communicating or broadcasting descrambling information (e.g. ECMs, EMMs) and scrambled content streams to the receiver 2. For example, the distribution network 6 may comprise one or more of a cable network, a satellite communication network, a terrestrial broadcast network, the internet, etc.

The (scrambled) content stream may comprise any kind of content data, such as one or more of video data, audio data, image data, text data, application/software data, program guide data, etc.

The receiver 2 may be any type of receiver (or client device) for receiving ECMs, EMMs and scrambled content streams. For example, the receiver 2 may be a set-top box, a receiver integrated into a content output device (such as a television or radio), a mobile terminal supporting broadcast services, a personal computer, etc. The receiver 2 may include, or be communicatively coupled to, a device for outputting or reproducing descrambled and decoded content to a user (such as a screen/monitor and/or one or more speakers).

The receiver 2 includes a chip set 1 for descrambling and/or decoding scrambled and/or encoded content. The chip set 1 may be communicatively connected to a CA/DRM client 3. In general, the receiver 2 receives, filters and forwards ECMs and EMMs to the CA/DRM client 3 for further processing. The CA/DRM client 3 accesses conditional access (CA) data from the received ECMs and EMMs and can then load control words onto the chip set 1 using any methods and systems as described in relation to FIGS. 4, 9, 12 and 13. The CA/DRM client 3 may be a secure device removable from the receiver 2, such as a smart card (and may therefore comprise a processor and memory for carrying out the CA/DRM client functionality to be described below). Additionally or alternatively, the CA/DRM client 3 may be integral with the receiver 2 and may be implemented as a hardware component of the receiver 2 and/or in software running in a secured environment of the receiver 2 and/or in obfuscated software running in the receiver 2.

The bandwidth required for transmitting conditional access messages (EMMs and/or ECMs) using the methods and systems described below is comparable to the bandwidth required by existing mechanisms to securely load control words onto a chip set. This is important as bandwidth is a valuable resource and the solutions described below ought not degrade the overall performance of the system 7. The methods and systems described below provide a solution for protecting the confidentiality and authenticity of a control word that allows every CA/DRM system and CA/DRM system operator to establish a key loading mechanism independently, that is, without the need to share any secrets between CA/DRM systems (with the obvious exception of sharing control words in a SimulCrypt operation, as control words are, by definition, shared in a SimulCrypt operation). In addition, no trusted party in the scheme needs to manage any secret associated with a receiver (chip set) after its personalization is completed. This implies that the role of the trusted party is comparable to the role of the chip set manufacturers in currently available vertical market receiver solutions. In addition, the new methods and systems can recover from a security breach in which the root key pair of the control word authenticity mechanism is compromised, a security feature not offered by existing solutions.

Figure 4:
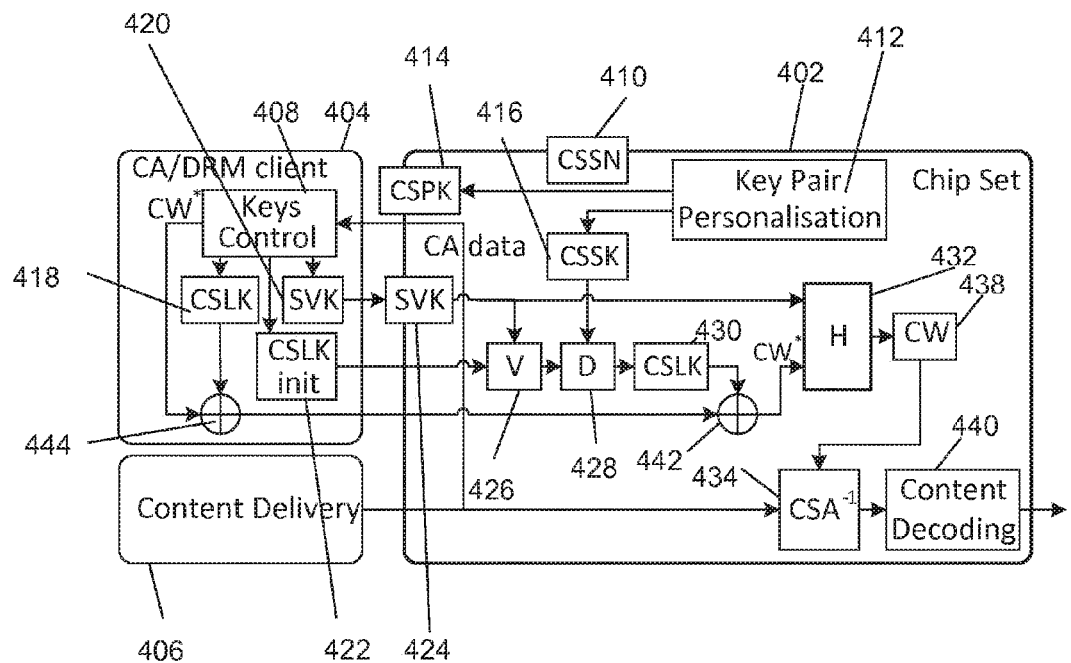
FIG. 4 schematically illustrates an example method of using a chip set.

FIG. 4 schematically illustrates an example method of using a chip set. By way of illustration, the method is implemented using a chip set 402 and a CA/DRM client 404. A content delivery module 406 (e.g. of a head-end system 4) may provide conditional access data (such as ECMs and EMMs) and a scrambled content stream to the chip set 402 of a receiver 2. The chip set 402 may pass the conditional access data to the CA/DRM client 404 for further processing.

When manufactured, the chip set 402 may be personalized with a key pair. During the personalization phase, this key pair is associated with a chip set serial number CSSN. The CSSN may be stored in a memory element 410 of the chip set 402. The key pair includes a chip set public key CSPK (which is stored in a memory element 414 of the chip set 402) and a corresponding chip set secret (private) key CSSK (which is stored in a memory element 416 of the chip set 402). The key pair is preferably generated in the chip set 402 (e.g., using key pair personalization module 412). Alternatively, the key pair personalization module 412 may be implemented outside the chip set 402 (e.g., in a chip set personalization system available to the chip set manufacturer), and the manufacturer may load CSSK and CSPK into the chip set 402 during its personalization. After this, the manufacturer can delete CSSK from its system(s). As will become apparent, the associated public-key cryptosystem is used to protect the confidentiality of control words needed to descramble scrambled content received by the chip set 402. The use of public-key cryptography allows the chip manufacturer to publish both the CSSN and the CSPK for every chip set that is produced. The manufacturer of the chip sets 402 maintains pairs of numbers, each pair comprising of a chip set serial number CSSN and its associated chip set public key CSPK. The list of (CSSN, CSPK) pairs can be made available to all CA/DRM systems. During the distribution to a CA/DRM system, only the authenticity of this information should preferably be protected.

To prevent an adversary from also using the CSPK to successfully generate and use CW loading messages in a chip set, the systems and methods described below have an additional mechanism that requires the chip set 402 to verify the authenticity of a CW loading message. This mechanism prevents an adversary from issuing control words to the chip set 402 even with the knowledge of the chip set's published CSPK.

The systems and methods described below achieve this by using another asymmetric key pair that is associated with a CA/DRM system associated with the head-end system 4. This key pair includes a (public) signature verification key SVK and a corresponding (secret/private) signature key SK associated with the CA/DRM system. This key pair is for use in an asymmetric cryptographic scheme consisting of a signature generation algorithm and a corresponding signature verification algorithm. The key pair (SK, SVK) is preferably generated by the CA/DRM system associated with the head-end system 4, and its secret key SK does not need to be known to any CA/DRM supplier.

The CA/DRM client 404 may include a communication module for receiving ECMs and/or EMMs and/or other conditional access information forwarded by the chip set 402 and/or the receiver 2. This communication module may be implemented within a keys control module 408 of the CA/DRM client 404. The keys control module 408 may obtain the SVK from conditional access data that it receives from the content delivery module 406 via the chip set 402. SVK may be provided by the head-end system 4 to the CA/DRM client 404.

The signature verification key SVK is stored in a memory element 420 of the CA/DRM client 404. The CA/DRM client 404 may send the signature verification key SVK to the chip set 402 so that the chip set 402 may store the SVK in a memory element 424 of the chip set 402.

As will become apparent from the discussion below, a CA/DRM system associated with the head-end system 4 generates a random value CW* (or interchangeably referred to as a "virtual control word"). The virtual control word CW* is not directly used for (de-)scrambling the content. Instead, a value derivable from CW* and SVK, namely the control word CW, is the key used for (de-)scrambling the content. The head-end system 4 sends the virtual control word CW* to the chip set 402 of the receiver 2 using an ECM. The chip set 402 filters and forwards the received ECM to the CA/DRM client 404 as part of the conditional access data forwarded to the CA/DRM client 404. The keys control module 408 obtains the virtual control word CW* from an ECM that it has received.

The chip set 402 comprises a descrambler 434 for descrambling scrambled content. As mentioned, the chip set 402 does not use CW* directly in the descrambler 434, but derives a CW from CW* and SVK (stored in the memory element 424) using a hash function H implemented by a H-module 432 of the chip set 402. The H-module 432 may merge the two inputs (CW* and SVK) before applying the hash function to the merged inputs to produce the output CW. The H-module 432 may be implemented within a cryptographic/secure module of the chip set 402. The function H may also be any other suitable cryptographic function (i.e. it need not necessarily be a hash function). Possible implementations of the function H preferably have the following property: given an output CW, it is hard (e.g., difficult, computationally difficult, infeasible or computationally infeasible) to find a key pair (SK*, SVK*) and a virtual control word CW** such that SVK* and CW** map to CW (i.e. such that providing SVK* and CW** as inputs to function H, or as inputs to the H-module 432, would result in outputting the control word CW). In certain embodiments, "hard" may mean that an adversary may not be able to derive a key pair (SK*, SVK*) and a virtual control word CW**, such that SVK* and CW** map to CW, in polynomial time or space. In other embodiments, "hard" may be defined by specifying a lower bound on the number of operations or on the size of the memory required to find such values. As a third example, one may define "hard" by specifying an upperbound on the probability that the property is not satisfied.

An example of a function H with this property is the following: (1) merge the inputs CW* and SVK to produce an intermediate result X, e.g., by appending the value of SVK to the value of CW*, (2) apply a $2^{nd}$ pre-image resistant hash function to the input X to produce the output CW. To see that the preferred property holds for this example, observe that, given the control word CW and the public key SVK, it will be hard for an adversary to determine an SVK* not equal to SVK, and a virtual control word CW** such that SVK* and CW** map to CW. To see this, assume that it is feasible for an adversary to generate such an SVK* and such a CW**. Then, given the output CW and the inputs SVK and CW*, the same method can be applied to generate a second pre-image comprising of SVK* and CW** to the hash function, as SVK* is not equal to SVK. This implies that the hash function is not $2^{nd}$ pre-image resistant, contradicting the assumption. As a result, the only option for the adversary is to determine a signature key associated with the public key of the CA/DRM system associated with the head-end system 4 (i.e. SVK) which is, by definition, infeasible for an asymmetric scheme. In addition, notice that the function H satisfies the desired property also in case the virtual control word CW* is known (i.e., in case both inputs to the $2^{nd}$ pre-image resistant hash function are known). This can be seen as follows: given an output CW and the specified inputs to the $2^{nd}$ pre-image resistant hash function, it is, by definition, infeasible to determine a second, different set of inputs to the $2^{nd}$ pre-image resistant hash function that map to the given output CW. This implies that the adversary cannot determine a signature verification key different from SVK that maps to the given CW. The only option for the adversary is to determine a signature key associated with SVK, which is, by definition, infeasible for an asymmetric cryptographic scheme.

After applying the function H, the H-module 432 stores the output CW in a memory element 438 of the chip set 402. Using CW from the memory element 438, the descrambling module 434 may descramble content provided by the content delivery module 406 and transmit descrambled content to a content decoder 440 of the chip set 402 for further processing (e.g. video or audio decompression). The content decoder 440 may be implemented in the receiver 2 as a module separate from (or external to) the chip set 402.

Symmetric encryption is used to protect the confidentiality and the authenticity of a virtual control word CW*. In particular, a symmetric chip set load key CSLK is generated for a chip set 402 (and is preferably unique to that chip set 402) by a CA/DRM system associated with the head end system 4. The CSLK (intended for the CA/DRM client 404, and protected using the confidential and authentic channel offered by the CA/DRM system) is transmitted along with an initialization pattern CSLK-init (intended for the chip set 402) to the CA/DRM client 404 connected to the chip set 402. The initialization pattern CSLK-init includes an encrypted version of CSLK (encrypted using the CSPK of the chip set 402) and, as will be described later, a signature of the encrypted version of CSLK (where the signature is generated using the signature key SK). Hence, the CSLK is encrypted to produce the CSLK-init in such a way that CSLK-init can be processed in the chip set 402 to produce a CSLK value.

In some embodiments, the CSLK (intended for the CA/DRM client 404, and protected using the confidential and authentic channel offered by the CA/DRM system) and the initialization pattern CSLK-init (intended for the chip set 402) are transmitted from the head-end system 4 to the chip set 402 using one or more EMMs, and the chip set 402 may filter out the EMM(s) and forward it/them to the keys control module 408 in the CA/DRM client 404. (If a unique pairing between the CA/DRM client 404 and the chip set 402 is not known within the head-end system 4, then preferably separate EMMs are used for packaging and transmitting CSLK and the initialization pattern CSLK-init.) The keys control module 408 may then extract CSLK and CSLK-init from the EMM(s) for use by the CA/DRM client 404 and the chip set 402. The CSLK may be stored in a memory element 418 of the CA/DRM client 404 and the CSLK-init may be stored in a memory element 422 of the CA/DRM client 404. The CA/DRM client 404 may subsequently forward the initialization pattern CSLK-init to the chip set 402.

The CA/DRM client 404 encrypts CW* (that its keys control module 408 has extracted from an ECM that has been forwarded to the keys control module 408) with CSLK (stored in memory element 418) to produce $\{CW^*\}_{CSLK}$ using a symmetric encryption module 444 of the CA/DRM client 404. The encryption of CW* with CSLK may be performed in any suitable security module in the CA/DRM client 404. The encrypted version of CW*, $\{CW^*\}_{CSLK}$, is then transmitted to the chip set 402, where $\{CW^*\}_{CSLK}$ is to be decrypted using a symmetric decryption module 442 of the chip set 402 (corresponding to the symmetric encryption module 444). The decryption module 442 use the CSLK value stored in a memory element 430 of the chip set 402 to obtain CW*.

The initialization pattern CLSK-init and/or the encrypted version of CW* may be transmitted from the CA/DRM client to chip set 402 using any suitable transmission module in the CA/DRM client 404 communicably connected with the chip set 402. The encrypted version of CW* and/or the initialization pattern CLSK-init may be received at chip set 402 using yet another communication module in the chip set 402.

To obtain the CSLK value, stored in the memory element 430, for decrypting $\{CW^*\}_{CSLK}$, the chip set 402 includes two cryptographic operations, implemented as a signature verification module 426 and a decryption module 428. The signature verification module 426 and the decryption module 428 may be implemented in any suitable cryptographic module within the chip set 402. The chip set 402 uses the signature verification module 426 and the SVK of the CA/DRM system associated with the head-end system 4 (stored in the memory element 424 of the chip set 402), to verify the authenticity of CSLK-init. If the signature verification module 426 determines that CSLK-init is not authentic (i.e. if the signature has not been generated using an SK associated with SVK), then the chip set 402 may take any suitable subsequent action to ensure that the user of the receiver 2 does not gain access to decrypted content, such as not performing any content decryption until a new CSLK-init message and/or a new SVK have been received so that the new CSLK-init message can be verified. Alternatively, the signature verification module 426 may output a value from which the decryption module 428 will be able to obtain CSLK only if the verification is successful, i.e. if the CSLK-init has been signed using an SK corresponding to the SVK stored in the memory element 424; otherwise, the signature verification module 426 may output a value from which the decryption module 428 will not be able to obtain CSLK if the verification is not successful, i.e. if the CSLK-init has been not been signed using the SK corresponding to the SVK stored in the memory element 424. For example, a signature mechanism with message recovery may be used.

After verification of the authenticity of CSLK-init, the encrypted CSLK in CSLK-init is decrypted using the CSSK of the chip set 402 (stored in the memory element 416). As the CSLK was encrypted by the CSPK of the chip set 402, only the chip set having the corresponding CSSK may correctly decrypt CSLK from the CSLK-init message.

Once the chip set 402 obtains CSLK, then $\{CW^*\}_{CSLK}$ may be decrypted by the decryption module 442 to obtain CW* using the obtained CSLK. The authenticity of CW* is protected, in that an adversary cannot construct an encrypted CW* message for a given CW* that will produce CW* in the chip set 402 if the authenticity of SVK and the authenticity of the CSLK-init message are protected. The authenticity of the CSLK-init message is protected by signing it with SK. Using the H-module 432 and the SVK value stored in the memory element 424, SVK and CW* may be merged and processed to produce CW. The H-module protects the authenticity of the signature verification key SVK, in that content descrambling will fail if SVK is not authentic. That is, if the signature verification key of a key pair (SK*, SVK*), determined by an adversary not knowing the signature key SK, is provided as input to the chip set (e.g., to load a CSLK chosen by the adversary, and using this CSLK to load a given CW*), then the H-module 432 will not output the correct CW, and consequently, the content descrambling will fail.

The symmetric chip set load key CSLK is used to decrypt CW* values that are encrypted with a symmetric encryption algorithm and the key CSLK. The H-module 432 suitably derives the CW from the CW* and the SVK, such that CW may be loaded into the descrambling module 434 to descramble content. This implementation has the benefit that the chip set 402 only needs to perform public-key cryptographic operation(s) when processing a CSLK-init message to initially obtain CSLK. During normal operation, CSLK and SVK can be stored inside the chip set, and the CW processing overhead resembles that of the existing systems. The computation step associated with the H-module 432 is comparable to that of a normal symmetric encryption (or decryption) step.

Figure 5:
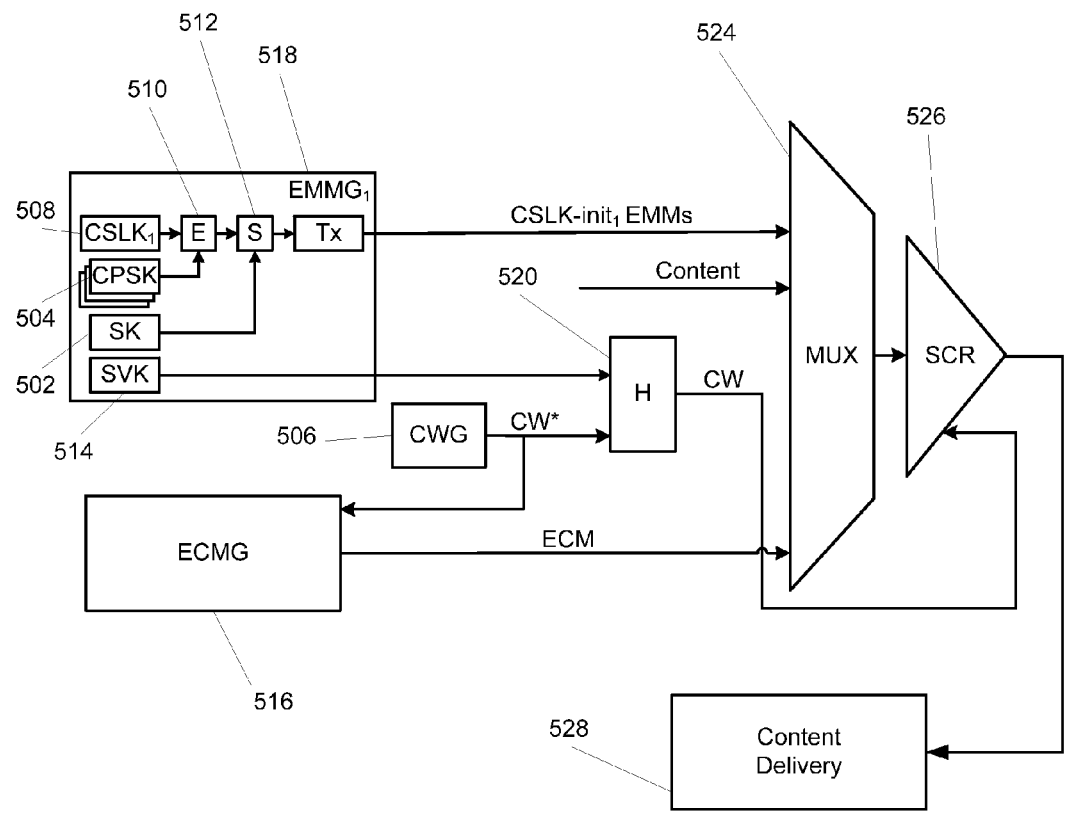
FIG. 5 schematically illustrates a method for use in a head-end system of a content delivery network.

To work with the CA/DRM client/chip set configuration described in relation to FIG. 4, the head-end system 4 is configured to produce the chip set load key initialization pattern (CSLK-init) for each chip set 402. FIG. 5 schematically illustrates a method for use in such a head-end system 4 of a content delivery network.

Specifically, an EMM generator 518 of the head-end system 4 generates a random chip set load key CSLK for a target chip set 402 (e.g., using a chip set load key generator 508 of the EMM generator 518). The CSLK may be generated using any pseudo-random number generator. Preferably, the EMM generator 518 uses the chip set load key generator 508 to generate a CSLK that is unique to each chip set 402 in a population of chip sets 402—i.e. each receiver 2 being serviced by the CA/DRM system at the head-end system 4 has its own CLSK different from the other receivers 2. This prevents the (unauthorized) sharing of a message $\{CW^*\}_{CSLK}$.

The EMM generator 518 encrypts the generated CSLK using the CSPK of the target chip set 402 (e.g., using an encryption module 510 of the EMM generator 518).

The EMM generator 518 may comprise a CSPK store 504 that stores the CSPKs of the chip sets 402 being serviced by this CA/DRM system. The encryption module 510 performs an encryption process corresponding to the decryption process performed by the decryption module 428 of the chip set 402.

The EMM generator 518 uses the SK (as stored in memory element 502 of the EMM generator 518) to sign the encrypted CSLK to produce the chip set load key initialization pattern CSLK-init (e.g., using a signature module 512 of the EMM generator 518). The EMM generator 518 then packages the generated CSLK-init along with the CSLK (intended for the CA/DRM client 404, and protected using the confidential and authentic channel offered by the CA/DRM system) to form an EMM. This EMM is targeted at the CA/DRM client 404 connected to the chip set 402 with the corresponding CSPK or CSSN. If a unique pairing between the CA/DRM client 404 and the chip set 402 is not known within the head-end system 4, then preferably separate EMMs are generated and used for packaging and transmitting CSLK and CSLK-init.

The head-end system 4 includes a CW generator 506 which generates random values for CW*. The CW generator 506 may generate random values for CW* using any pseudo-random number generator.

The head-end system 4 includes an ECM generator 516 that receives a CW* generated by the CW generator 506 and generates an ECM containing the received CW*.

The head-end system 4 includes a multiplexer 524. The multiplexer 524 selects the appropriate data to be transmitted to a CA/DRM module (or scrambling module) 526, choosing at least one of: an ECM output from the ECM generator 516, an EMM output from the EMM generator 518, and content. ECMs and/or EMMs may be passed from the multiplexer 524 to a content delivery module 528 for transmission to the chip set 402. The content passed from the multiplexer 524 is scrambled by the CA/DRM module 526 using CW. This may involve any form of content scrambling technique corresponding to the content descrambling that the content descrambling module 434 is capable of performing. Subsequently, the scrambled content is provided to the content delivery module 528, which transmits the scrambled content to a receiver 2.

The head-end system includes an H-module 520 to produce control words for scrambling content in the CA/DRM module 526. The H-module 520 may be implemented in a cryptographic module. To produce CW, the H-module 520 implements a function H corresponding to the H-module 432 of FIG. 4. In particular, the H-module derives CW from the CW* value that is generated by the CW generator 506 and that is transmitted in an ECM provided by the ECM generator 516. The H-module 520 combines the signature verification key SVK stored in a memory element 514 with CW* generated by the CW generator 506 and applies a function H (e.g. a hash function) to convert the CW* value into CW—the above description (and requirements) of the H-module 432 and the function H of the chip set 402 applies to the H-module 520 and its function H. The H-module 432 of the chip set 402 produces the same output CW as the H-module 520 of the head-end system 4 when they are provided with the same input (SVK and CW*).

The methods and systems described above may be used in a system such as the head-end system described in the DVB SimulCrypt specification (DVB=digital video broadcasting)—see ETSI TS 103 197. The DVB SimulCrypt specification allows two or more CA/DRM systems to share a control word CW as a common key. A common head-end system protocol for facilitating the sharing of the CW streams used in scrambling the digital TV content streams is described in the DVB SimulCrypt specification.

Figure 6:
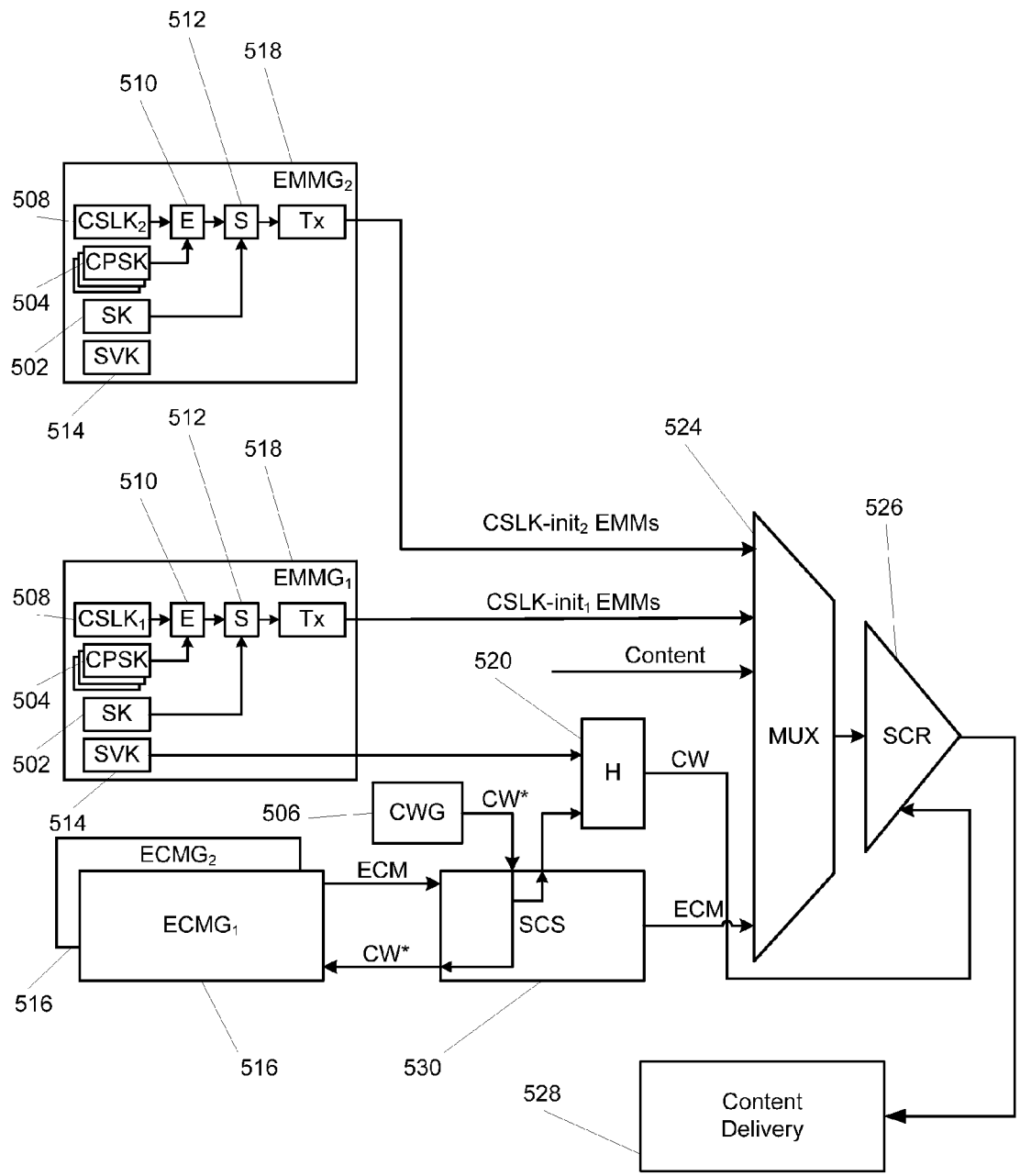
FIGS. 6-8 schematically illustrate methods for use in a head-end system of a content delivery network that makes use of DVB SimulCrypt.

FIG. 6 therefore schematically illustrates a method for use in such a head-end system 4 of a content delivery network that makes use of DVB SimulCrypt. In particular, in FIG. 6 the head-end system 4 comprises two CA/DRM systems that have respective EMM generators 518 ($EMMG_1$ and $EMMG_2$) and ECM generators 516 ($ECMG_1$ and $ECMG_2$). As is known, a SimulCrypt synchronizer 530 is used to coordinate the multiple ECM generators 516 (for example, by obtaining the CW* output by the CW generator 506, providing the CW* to the ECM generators 516 along with any CA/DRM-specific parameters, acquiring the ECMs from the ECM generators 516, synchronizing the timing of the ECMs and their provision to the multiplexer 524). In the normal DVB system as set out in ETSI TS 103 197, the SimulCrypt synchronizer 530 would pass control words to the scrambling module 526—however, as discussed above, it is the H-module 520 which generates the actual control words CW used for content scrambling and passes those generated control words CW to the scrambling module 526 (because the ECMs do not make use of CW but make use of CW* instead)—therefore, in FIG. 6 the SimulCrypt synchronizer 530 is shown as providing CW* to the H-module 520. Hence, a standard SimulCrypt synchronizer 530 may be used, the only difference being that its "control word output" is connected to the H-module 520 instead of directly to the scrambling module 526.

The two CA/DRM systems in FIG. 6 are potentially run or operated by different CA/DRM system operators (i.e. providers). It will be appreciated that any number of CA/DRM systems may be associated with the head-end system 4 and that embodiments are not limited to just two CA/DRM systems.

In the system shown in FIG. 6, the participating CA/DRM systems share the (SK, SVK) pair. In particular, the first EMM generator 518 ($EMMG_1$) and the second EMM generator 518 ($EMMG_2$) both have knowledge of, and make use of, the same SK and SVK. In particular, they both generate EMMs for the receivers 2 associated with their respective CA/DRM system as described above, based on a common SK and SVK.

The sharing of a common SK and SVK as set out above has a number of drawbacks. In particular:

A confidential channel between the various CA/DRM systems is required to transport and share the secret key SK. However, a confidential electronic interface between different CA/DRM systems may not exist (especially if the CA/DRM systems are associated with different CA/DRM suppliers). Therefore it would be desirable to let each CA/DRM system generate its own SK(s) and only share the associated (public) signature verification key(s) SVK(s). For instance, such an SK could be generated inside a hardware security module of a CA/DRM system of the head-end system 4 and does not need to be available unprotected at any point in time.

A renewal of the pair (SK, SVK), e.g. after the secret signature key SK has been compromised, has a similar operational impact for all of the CA/DRM systems participating in the SimulCrypt operation and making use of SK. In particular, new CSLK-init EMMs signed with the new signature key have to be generated and distributed for every participating CA/DRM system and all of the receivers 2 that they are servicing. It would be beneficial to limit the operational impact of a renewal of the pair (SK, SVK).

Figure 7:
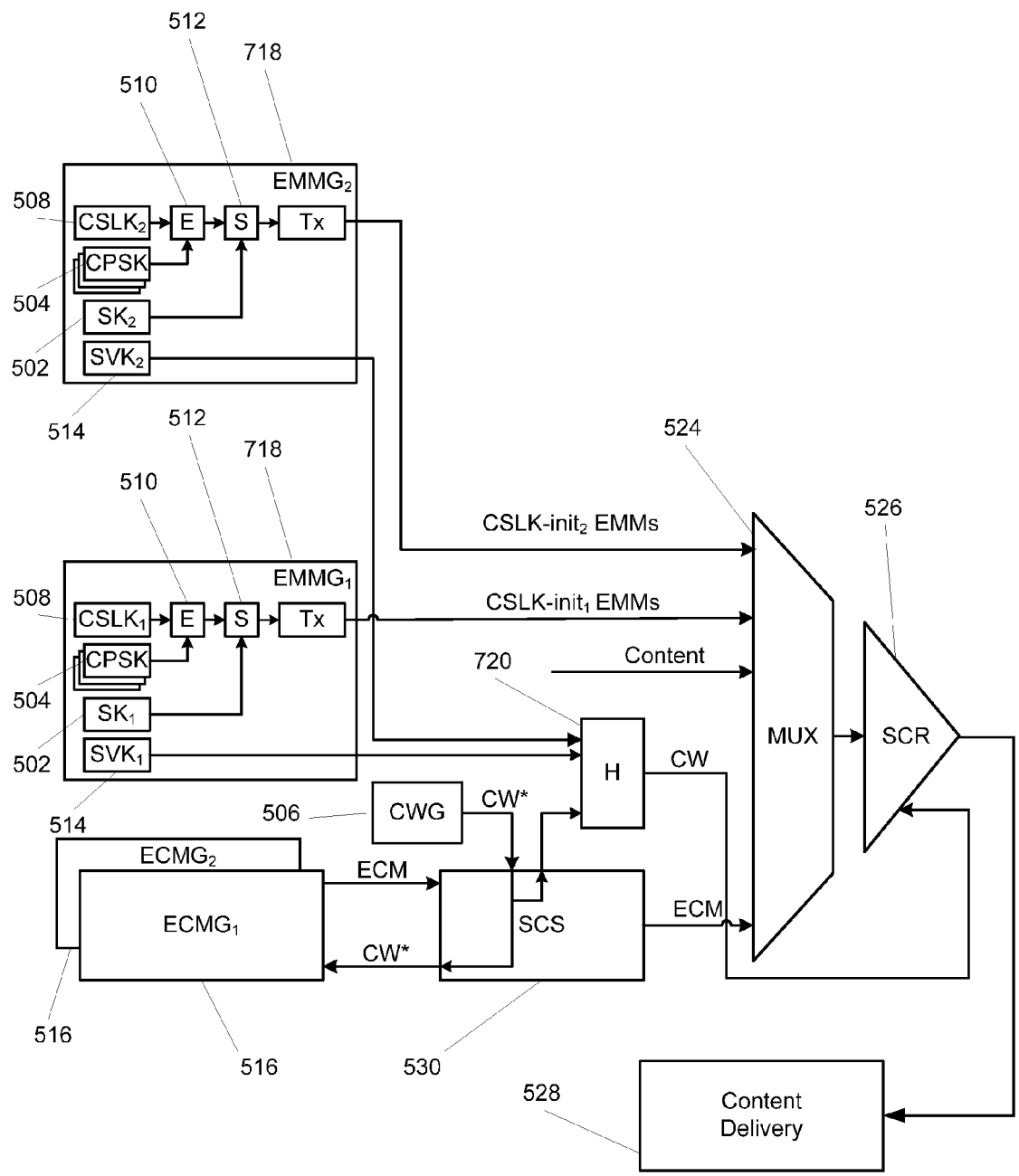

Embodiments aim to address these issues. FIG. 7 therefore schematically illustrates a method for use in a head-end system 4 of a content delivery network that makes use of DVB SimulCrypt. In particular, in FIG. 7 the head-end system 4 comprises two CA/DRM systems that have respective EMM generators 718 ($EMMG_1$ and $EMMG_2$) and ECM generators 516 ($ECMG_1$ and $ECMG_2$). This is the same architecture as shown in FIG. 6, except that the EMM generators 718 ($EMMG_1$ and $EMMG_2$) comprise and make use of respective signature keys $SK_1$, $SK_2$ and corresponding respective signature verification keys $SVK_1$, $SVK_2$. In particular, the first CA/DRM system has its own signature key $SK_1$ and its own corresponding signature verification key $SVK_1$, whilst the second CA/DRM system has its own (different) signature key $SK_2$ and its own corresponding signature verification key $SVK_2$. Each CA/DRM system independently generates its own pair ($SK_i$, $SVK_i$) and can keep its signature key SK secret from all of the other CA/DRM systems—it needs only to publish the signature verification key $SVK_i$. Recall that this is a public key, so its confidentiality does not need to be protected. This implies that there is no longer a need for a confidential channel (or a protected interface) between CA/DRM systems in a SimulCrypt operation.

As with FIG. 6, the two CA/DRM systems in FIG. 7 are potentially run or operated by different CA/DRM system operators (i.e. providers). It will be appreciated that in the system shown in FIG. 7, any number of CA/DRM systems may be associated with the head-end system 4 and that embodiments are not limited to just two conditional access end-systems. Hence, in general, there may be n CA/DRM systems and hence n different respective pairs ($SK_i$, $SVK_i$).

The H-module 520 of FIG. 6 is replaced by an H-module 720 in the system shown in FIG. 7. In particular, as each CA/DRM system now has its own signature verification key $SVK_i$, the H-module 720 is arranged to receive the set of signature verification keys $SVK_1, \ldots, SVK_n$ and the CW* output from the CW generator 506. The H-module 720 implements a similar function H as the H-module 520, except that the security requirements are modified to cater for the fact that the H-module 720 operates on a set (or a plurality) of signature verification keys $SVK_1, \ldots, SVK_n$. In particular, the H-module 720 may merge the inputs CW*, $SVK_1, \ldots, SVK_n$ and may then apply a hash function to the merged inputs to produce the output CW. The function H may also be any other suitable cryptographic function (i.e. it need not necessarily be a hash function). Possible implementations of the function H preferably have the following property: given CW, it is hard (e.g., difficult, computationally difficult, infeasible or computationally infeasible) to find or calculate or determine a key pair (SK*, SVK*) and an input to the function H, such that the determined signature verification key SVK* is a signature verification key in the determined input to H, and such that CW is the output of H for this input (i.e. such that providing that input to function H, or as an input to the H-module 720, would result in outputting the control word CW). In certain embodiments, "hard" may mean that an adversary may not be able to derive such an input in polynomial time or space. In other embodiments, "hard" may be defined by specifying a lower bound on the number of operations or on the size of the memory required to find such an input. As a third example, one may define "hard" by specifying an upper-bound on the probability that the property is not satisfied.

An example of a function H with this property is the following: (1) merge the inputs CW*, $SVK_1, \ldots, SVK_n$ to produce an intermediate result X, e.g., by concatenating these values, (2) apply a $2^{nd}$ pre-image resistant hash function to the input X to produce the output CW. The analysis provided above when discussing the function H that accepts only a single SVK applies analogously to this modified function H that accepts a set of signature verification keys.

Figure 8:
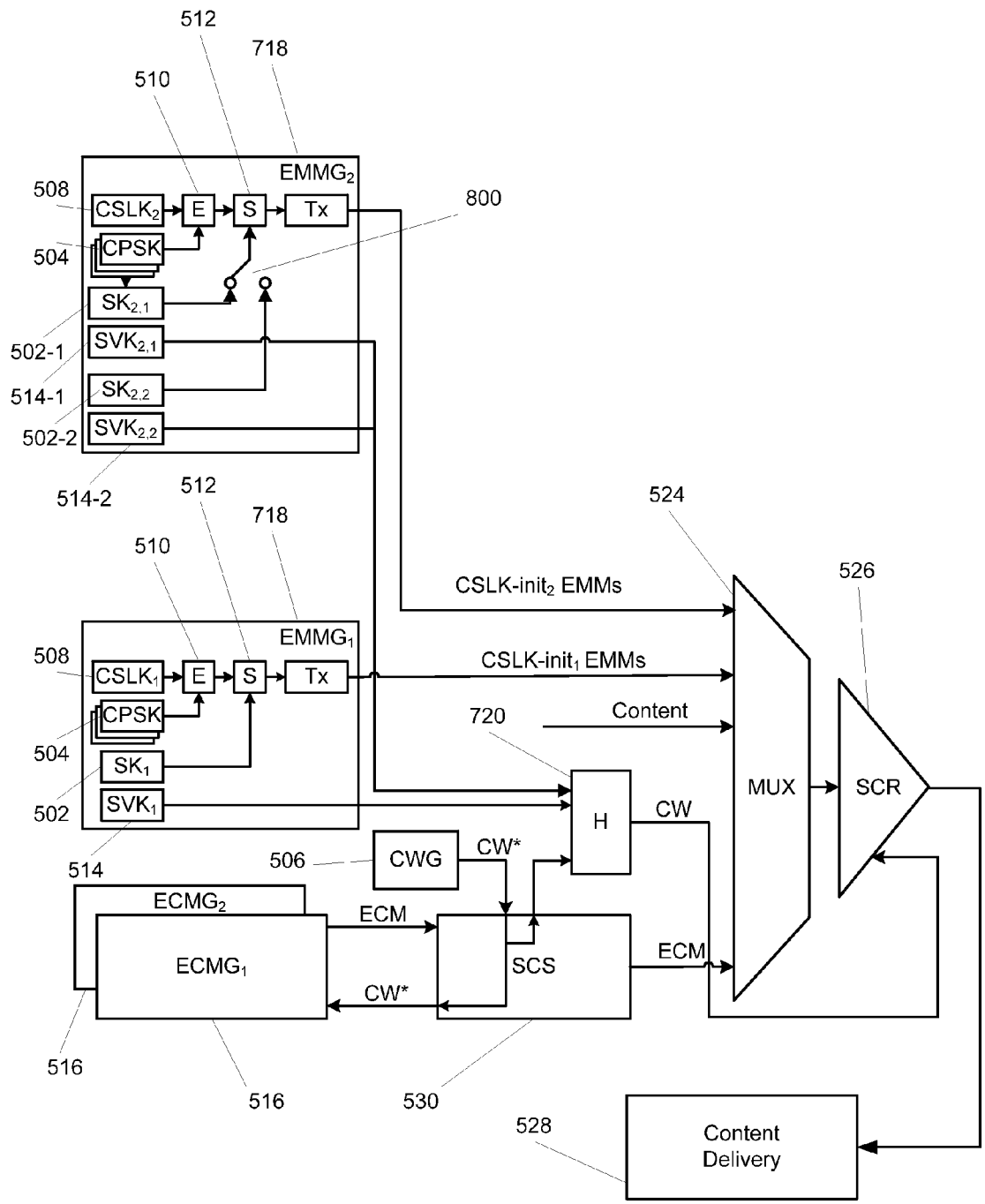

FIG. 8 schematically illustrates a further method for use in a head-end system 4 of a content delivery network that makes use of DVB SimulCrypt. The system and method illustrated in FIG. 8 are the same as those illustrated in FIG. 7, except that one of the CA/DRM systems has a plurality of pairs ($SK_{i,j}$, $SVK_{i,j}$). In particular, in FIG. 8, the second CA/DRM system has a first pair ($SK_{2,1}$, $SVK_{2,1}$) and a second pair ($SK_{2,2}$, $SVK_{2,2}$). However, it will be appreciated that a CA/DRM system may have any number of pairs ($SK_{i,j}$, $SVK_{i,j}$) of signature keys and corresponding signature verification keys. The EMM generator (EMMG$_2$) for the second CA/DRM system may comprise a switch 800 (or some other determining means) for selecting a particular SK$_{2,j}$ (out of the signature keys: SK$_{2,1}$ and SK$_{2,2}$, associated with that CA/DRM system) to use when carrying out the signature process to generate CSLK-init EMMs.

It will be appreciated that any number of CA/DRM systems associated with the head-end system 4 may have a plurality of associated pairs (SK$_{i,j}$, SVK$_{i,j}$) of signature keys and corresponding signature verification keys. Thus, in general, if there are m (m≥1) CA/DRM systems associated with a head-end system 4, and if the i-th (i=1 ... m) CA/DRM system has n$_i$ (n$_i$≥1) associated pairs (SK$_{i,j}$, SVK$_{i,j}$) of signature keys and corresponding signature verification keys, then there are $$n = \sum_{i=1}^{m} n_i$$

pairs (SK$_{i,j}$, SVK$_{i,j}$) of signature keys and corresponding signature verification keys. The H-module 720 receives the n signature verification keys SVK$_{i,j}$ from the CA/DRM systems as its input, along with the generated virtual control word CW*, and generates a control word CW as described above for FIG. 7.

As each CA/DRM system of FIGS. 7 and 8 uses signature keys (and associated signature verification keys) specific to that CA/DRM system (i.e. two CA/DRM systems do not use the same signature key), a CA/DRM system operator (i.e. a provider) can change the key pair of one CA/DRM system without a significant impact on the other CA/DRM systems (possibly operated by another CA/DRM system operator). More precisely, when a CA/DRM system updates a pair (SK$_{i,j}$, SVK$_{i,j}$) with a pair (SK, SVK), then: (a) the EMM generator of that CA/DRM system needs to generate and distribute new CSLK-init EMMs (containing CSLK values, and a signature based on the updated signature key SK) for the receivers 2 associated with this CA/DRM system; (b) the other CA/DRM systems should be made aware of the new signature verification key SVK; (c) all CA/DRM systems should distribute the new signature verification key SVK to all their associated receivers (because, as will be described below, the receivers will need access to the new signature verification key). In a broadcast network, this distribution is generally very bandwidth efficient, as the message containing the new signature verification key SVK can be identical for all receivers.

Hence, if one CA/DRM system updates/renews a key pair (SK$_{i,j}$, SVK$_{i,j}$) (e.g., after the signature key SK$_{i,j}$ is compromised) with an updated (SK, SVK) pair, then the impact on the other CA/DRM systems in the SimulCrypt operation is minimal. Moreover, if the signature key SK$_{i,j}$ is compromised, then the head-end security of the other CA/DRM systems is not compromised as their own signature keys are not the same as the compromised signature key. These other CA/DRM systems simply need to be made aware of the new updated signature verification key SVK and these other CA/DRM systems need to make the receivers 2 that they service also aware of the new updated signature verification key SVK, which is a straightforward operation for these other CA/DRM systems. If the signature key SK$_{i,j}$ is compromised, then receiver security is restored for all CA/DRM systems in the SimulCrypt operation as soon as the updated signature verification key SVK is used as input to the H-module (instead of using SVK$_{i,j}$), revoking the compromised signature key SK$_{i,j}$.

If a CA/DRM system operator wants to renew a key pair (SK$_{i,j}$, SVK$_{i,j}$) with a new key pair (SK, SVK), then switching to the new key pair happens simultaneously for all receivers 2 in an operator's population of receivers 2 (as the control words generated to scramble content will be based on the updated SVK, via the H-module 720, at the point of switching over to the new key pair). From an operational point of view, there is a risk that not all these receivers 2 have received all required information (via EMMs) when the provider starts using the new key pair (more precisely: the new SVK, a receiver's unique CSLK-init pattern signed with the new SK, or a CSLK intended for the CA/DRM client might not have been transmitted to, or received at, a receiver 2 via an EMM when the new SVK is used to generate control words). This can potentially cause a number of receivers to "black-out" for a while as they will not be able to successfully descramble content (as they will not be able to use the updated CSLK messages or the updated SVK). However, CA/DRM systems that have a plurality of associated (SK$_{i,j}$, SVK$_{i,j}$) pairs have the following advantage. A first (current) key pair (SK$_{i,j}$, SVK$_{i,j}$) can be used to generate CSLK-init pattern messages, that is, the signature key SK$_{i,j}$ is used to sign CSLK-init patterns. The signature key SK$_{i,k}$ of a second key pair (SK$_{i,k}$, SVK$_{i,k}$) is reserved for future use (securely storing the key SK$_{i,k}$). The signature verification keys of both the first and second pair (that is, SVK$_{i,j}$ and SVK$_{i,k}$) are used by the H-module 720 to generate control words CW for scrambling content. Suppose that the operator wants to revoke the first key pair (SK$_{i,j}$, SVK$_{i,j}$) (e.g., in case the signature key SK$_{i,j}$ is compromised). First, the CA/DRM system retrieves SK$_{i,k}$ from secure storage. Next, the CA/DRM system generates new CSLK-init EMMs, using SK$_{i,k}$ as the signature key (if CSLK is also updated, then also EMMs containing the new CSLK values for the CA/DRM clients need to be generated). The CA/DRM system distributes the EMMs to the receivers 2. The CA/DRM system also generates a third key pair (SK$_{i,w}$, SVK$_{i,w}$), and distributes the public signature verification key SVK$_{i,w}$ to all CA/DRM systems in the SimulCrypt operation. All CA/DRM systems distribute SVK$_{i,w}$ to their receivers (e.g., using an EMM). As long as the SVK$_{i,j}$ and SVK$_{i,k}$ are used by the H-module 720 to generate control words CW for scrambling content, the receivers 2 will accept (or continue to operate correctly and perform correct descrambling with) CSLK-init messages signed with the signature key SK$_{i,j}$ or SK$_{i,k}$. That is, during this time, the chip sets 402 can independently switch to using the new/updated CSLK-init message signed with SK$_{i,k}$, instead of forcing all chip sets 402 to switch at the same time. For instance, the CA/DRM system can request a group of CA/DRM clients 404 at a time to start using the new CSLK EMMs (the new CSLK-init pattern being signed with SK$_{i,k}$). This restricts the number of receivers 2 that can black-out simultaneously. After the CA/DRM system has requested all receivers 2 to use the new CSLK (EMMs), then receiver security can be restored by using SVK$_{i,w}$ as input to the H-module 720 instead of SVK$_{i,j}$. After this, the first key pair (SK$_{i,j}$, SVK$_{i,j}$) is renewed with the second key pair (SK$_{i,k}$, SVK$_{i,k}$), and receiver security is restored for the content encrypted with control words derived using SVK$_{i,w}$, in that the chip set will not accept CSLK-init messages signed with (the compromised) SK$_{i,j}$. Note that this process can be applied iteratively; the key pairs in the next iteration are (SK$_{i,k}$, SVK$_{i,k}$) and (SK$_{i,w}$, SVK$_{i,w}$).

Figure 9:
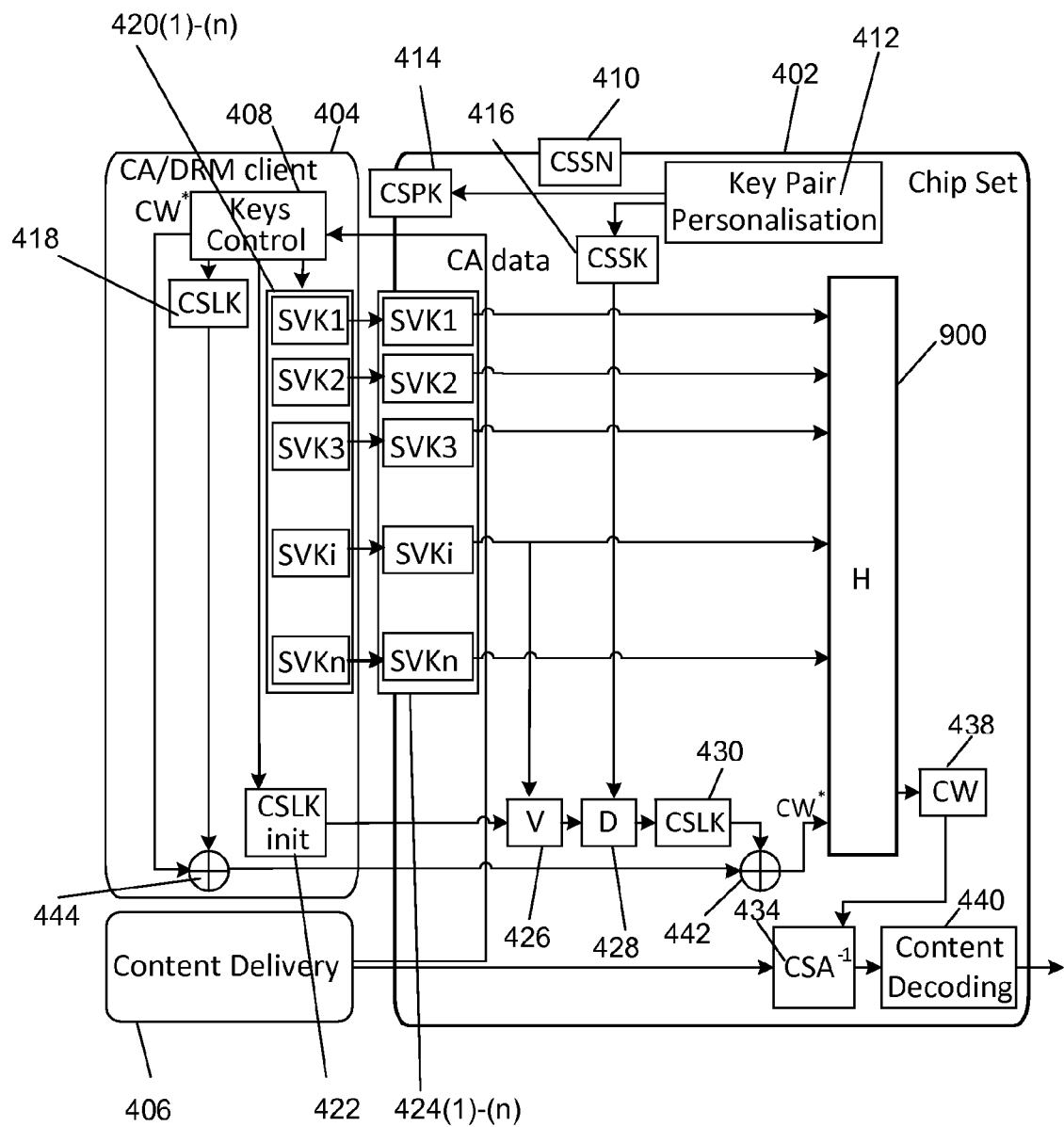
FIG. 9 schematically illustrates an example method of using a chip set.

FIG. 9 schematically illustrates an example method of using a chip set. This is the same as illustrated in FIG. 4 (and therefore only the differences between the two Figures shall be described below). The system and method shown in FIG. 9 is compatible with the systems illustrated in FIGS. 7 and 8.

In particular, instead of the CA/DRM client 404 being provided with a single signature verification key SVK and providing this to the chip set 402, the CA/DRM client 404 receives the set of n signature verification keys $SVK_1, \ldots, SVK_n$ and provides these n signature verification keys $SVK_1, \ldots, SVK_n$ to the chip set 402 (without loss of generality, a single subscript is used to distinguish the different signature verification keys; more than one key in this set may be associated with a single CA/DRM system). The CA/DRM client 404 may store each signature verification key $SVK_i$ in a corresponding memory element 420(i) of the CA/DRM client 404; the chip set 402 may store each signature verification key $SVK_i$ in a corresponding memory element 424(i) of the chip set 402.

The CA/DRM client 404 is informed of the set of signature verification keys $SVK_1, \ldots, SVK_n$ by the CA/DRM system (associated with the head-end system 4) that is servicing the receiver 2 of the CA/DRM client 404 as has been set out above.

Additionally, the H-module 432 of FIG. 4 has been replaced in FIG. 9 with an H-module 900. The H-module 900 operates in the same way as the H-module 720 of the systems illustrated in FIGS. 7 and 8. Thus, provided that the chip set 402 has been provided with legitimate/current signature verification keys $SVK_1, \ldots, SVK_n$, and provided that it has managed to successfully obtain a correct virtual control word CW*, then the output of the H-module 900 will be the same control word CW as that output by the H-module 720 in the head-end system 4 and hence the chip set 402 will be able to successfully descramble the scrambled content stream.

Preferably, a security requirement for the chip set implementation is that a CW* and a set of signature verification keys $SVK_1, \ldots, SVK_n$ may only be provided to the H-module 900 to derive a CW (or such a derived CW may only be used for content descrambling) if the authenticity of the CSLK-init message associated with the encrypted CW* is verified with one of the keys in the set of signature verification keys $SVK_1, \ldots, SVK_n$ and if the CSLK-init message is found to be authentic.

As the chip set 402 has a plurality of signature verification keys $SVK_1, \ldots, SVK_n$ available to it, the signature verification module 426 is arranged to select the signature verification key $SVK_i$ corresponding to the CSLK-init pattern that it receives from the CA/DRM client 404. For example, the head-end system 4 may assign a unique key identifier $ID_i$ to $SVK_i$, and may append $ID_i$ to $SVK_i$ and to a CSLK-pattern signed with the corresponding signature key $SK_i$. This enables the signature verification module 426 to select the associated signature verification key $SVK_i$ from the received set of signature verification keys $SVK_1, \ldots, SVK_n$. It will be appreciated that other mechanisms may be used to allow the signature verification module 426 to select the correct signature verification key $SVK_i$. For example, the signature verification module 426 may be arranged to try each of the signature verification keys $SVK_1, \ldots, SVK_n$ until one of them successfully verifies the signature of the CSLK-init pattern—if none of them successfully verify this signature, then the signature verification process has failed.

In some embodiments, the set of signature verification keys $SVK_1, \ldots, SVK_n$ and the CSLK-init message are provided to the chip set 402 with every encrypted CW*. In such embodiments, the set of signature verification keys does not need to be stored for future use inside the chip set 402.

In practice, the CA/DRM client 404 and the chip set 402 will use the key CSLK to protect the transfer of multiple virtual control words CW* from the CA/DRM client 404 to the chip set 402. To avoid time-consuming public-key operations for deriving every CW* (that is, the public-key decryption performed by the decryption module 428 using the CSSK of the chip set 402, and the signature verification performed by the signature verification module 426 using $SVK_i$), in some embodiments the key CSLK is stored (and maintained) inside the chip set 402 after it has been obtained (e.g. in the memory module 430). Thus, the public-key operations of the signature verification module 426 and the decryption module 428 only need to be performed when the chip set 402 receives a new CSLK-init pattern from the CA/DRM client 404.

In some embodiments, the set of signature verification keys $SVK_1, \ldots, SVK_n$ to be used as input to H-module 900 is provided to the chip set 402 with every encrypted CW* from the CA/DRM client 404. In such embodiments, the set of signature verification keys does not need to be stored for future use inside the chip set 402. If the set $SVK_1, \ldots, SVK_n$ is provided with an encrypted CW* message from the CA/DRM client 404, then before a stored CSLK is used to decrypt the encrypted CW*, some embodiments are arranged for the chip set 402 to verify whether CSLK (as stored in the memory module 430) has been loaded/obtained using one of the keys in the received set $SVK_1, \ldots, SVK_n$ (i.e. whether the process to initially obtain and store CSLK involved the signature verification module 426 performing a signature verification process on a received CSLK-init pattern using one of the received signature verification keys $SVK_1, \ldots, SVK_n$). One way to achieve this is the following: after processing a CSLK-init message (received together with the associated signature verification key $SVK_j$), the chip set 402 computes a cryptographic hash value of the signature verification key $SVK_j$ (that it used to verify the authenticity of the CSLK-init pattern), and the chip set 402 stores this hash value together with CSLK. For every signature verification key in the received set of signature verification keys (received together with the encrypted CW*), the chip set 402 can compute its hash value and can compare the computed hash value with the hash value stored with the CSLK required to decrypt the encrypted CW*—if this check reveals that the stored CSLK has been loaded using a valid signature verification key, then the stored CSLK may be used by the decryption module 434 to decrypt the encrypted CW*. Notice that in such embodiments a CSLK-init message only needs to be provided with the associated signature verification key $SVK_i$ (instead of the set of signature verification keys). That is, in such embodiments the signature verification module 426 does not need to be arranged to select the signature verification key $SVK_i$ from a set.

In some embodiments, the set of keys $SVK_1, \ldots, SVK_n$ (and their key identifiers $ID_1, \ldots, ID_n$) may be stored inside the chip set 402 for future use. That is, the stored set of keys (and their key identifiers) are used to process CSLK-init messages and encrypted CW* messages provided to the chip set 402 from the CA/DRM client 404. In such an embodiment, one or more CSLK-init patterns and one or more encrypted CW* can be provided to the chip set 402. The chip set 402 can derive CSLK from a CSLK-init message using the stored set of keys $SVK_1, \ldots, SVK_n$ and the stored set of key identifiers (used by signature verification module 426 to select the correct key from the stored set). The chip set 402 may store CSLK for future use. The chip set 402 uses the derived CSLK to obtain CW* from the encrypted CW*. Next, the chip set 402 can provide CW* and the stored set of keys $SVK_1, \ldots, SVK_n$ as input to the H-module 900 to produce the output CW. In this way, communication costs between the CA/DRM client 404 and the chip set 402 are reduced, and overall system performance may be improved.

In some embodiments, multiple CSLK keys are stored (and maintained) inside the chip set 402 after they have been obtained (as set out above). Storing multiple CSLK keys can avoid having to perform public-key operations when switching from a current stored CSLK to another stored CSLK. This is particularly useful if the chip set 402 supports the concurrent use of multiple CA/DRM clients 404, each of which may use a different CSLK (and possibly a different set of signature verification keys), as the chip set 402 can then perform (fast) switching between CSLKs as and when desired/necessary.

If the set of keys $SVK_1, \ldots, SVK_n$ (and their key identifiers $ID_1, \ldots, ID_n$, or cryptographic hash values of the keys $SVK_1, \ldots, SVK_n$) are stored inside the chip set 402 for future use, and if a new set of signature verification keys is provided to the chip set 402 (to be stored inside the chip set 402 instead of the set of keys $SVK_1, \ldots, SVK_n$), then the chip set 402 may be arranged to determine whether one or more of the stored CSLK(s) was(were) loaded using a key that is not present in the set of newly received signature verification keys. For example, the key identifier $ID_i$ (or cryptographic hash value) of the signature verification key $SVK_i$ used to verify the authenticity of the CSLK-init message may be stored together with CSLK. The newly received set of signature verification keys, the stored set of signature verification keys $SVK_1, \ldots, SVK_n$ (and their key identifiers or their cryptographic hash values) and the key identifiers (or the cryptographic hash values) stored with the CSLK(s) can be used to determine whether one or more of the stored CSLK(s) was(were) loaded using a key that is not present in the set of newly received signature verification keys. If there are any such CSLK(s), then the chip set 402 may be arranged to not use such a CSLK to derive a CW* (e.g., such CSLKs can be de-activated or simply deleted from the memory module 430). Alternatively, all stored CSLKs may be deleted from the memory module 430 whenever a new set of verification keys is loaded and stored inside the chip set 402. Further, if stored CSLK(s) was(were) de-activated, then the chip set 402 may be arranged to (re-)activate the CSLK(s) if a new set of signature verification keys is provided to the chip set 402, and if the associated CSLK-init pattern was verified using one of the keys in this new set. For instance, (re-)activation can be useful if the chip set 402 supports the concurrent use of multiple CA/DRM clients 404, each of which may use a different CSLK and a different set of signature verification keys, as the chip set 402 can then perform (fast) switching between CSLKs as and when desired/necessary.

Figure 10:
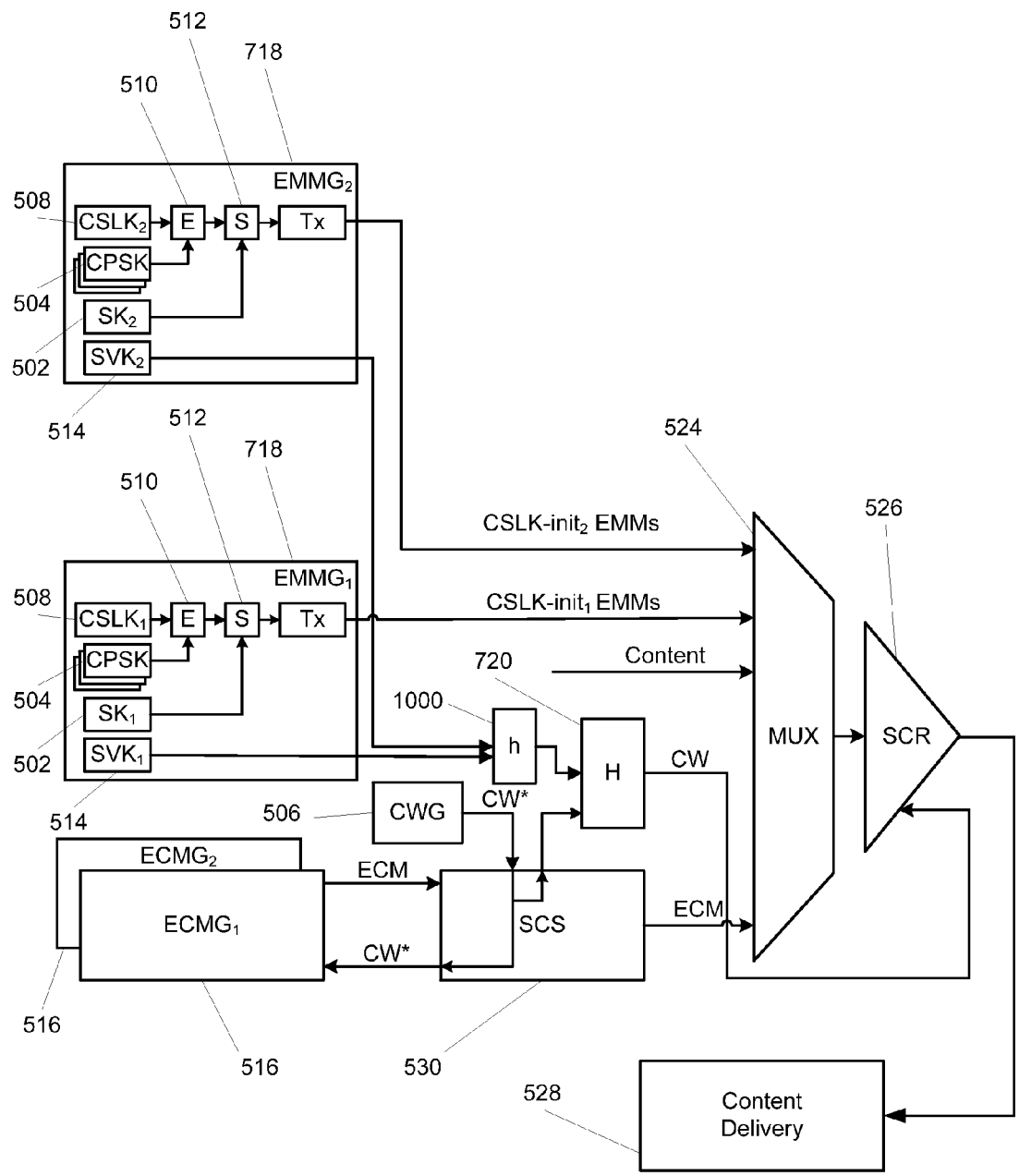
FIGS. 10-12 schematically illustrate modified versions of the systems and methods illustrated, respectively, in FIGS. 7-9.
Figure 11:
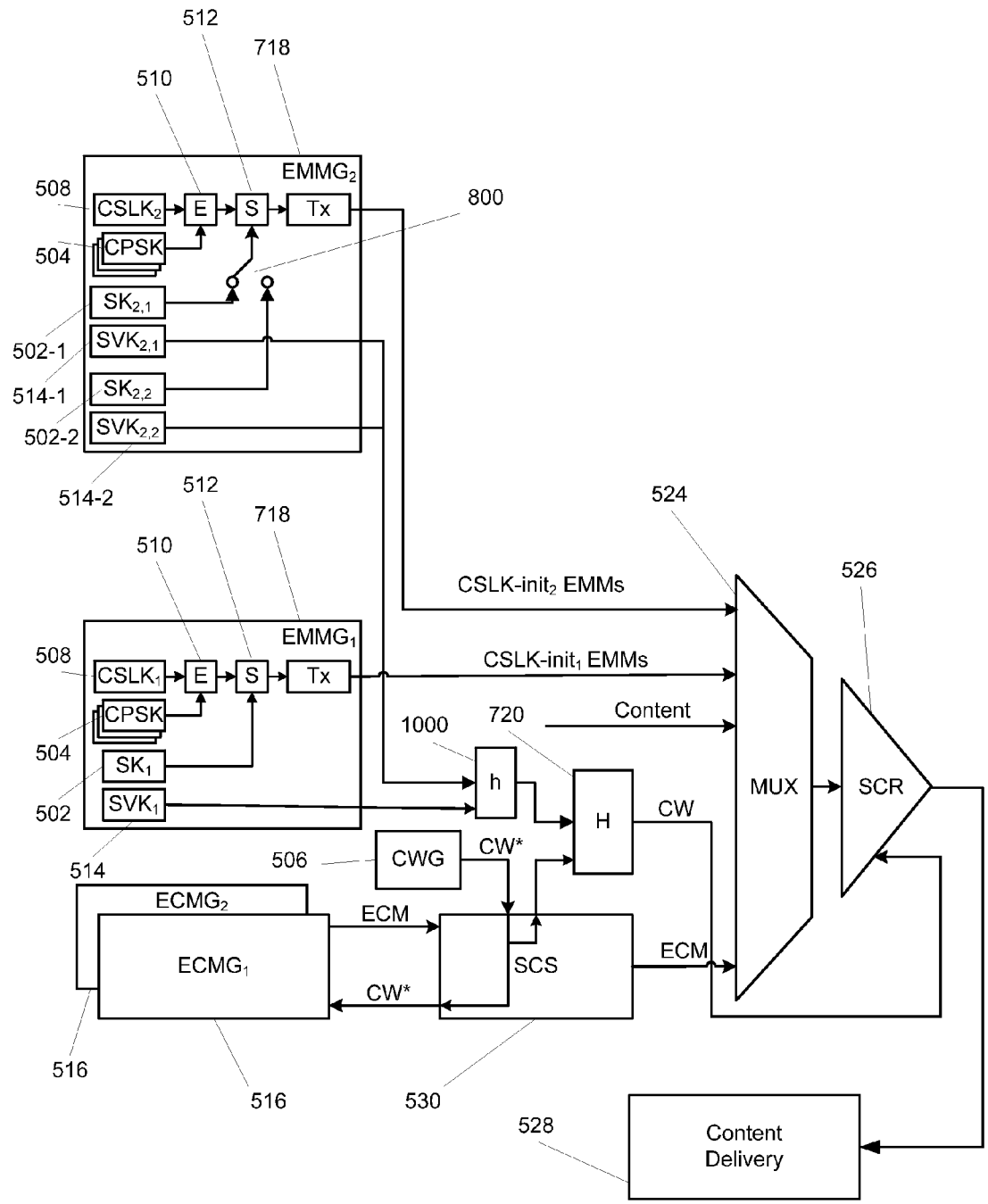
Figure 12:
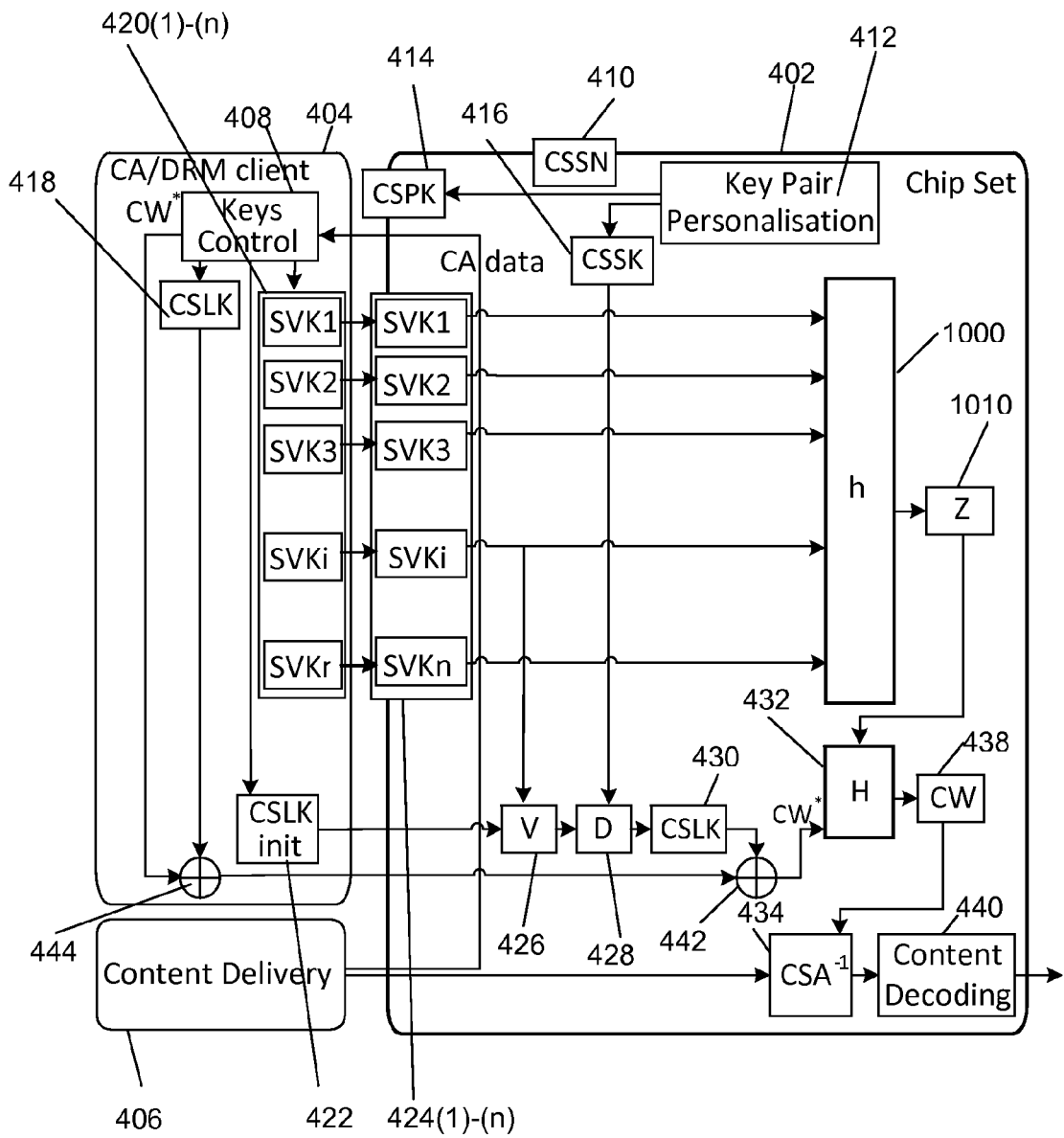

FIGS. 10-12 schematically illustrate modified versions of the systems and methods illustrated, respectively, in FIGS. 7-9. The difference is that the head-end systems 4 and the chip sets 402 illustrated include an h-module 1000. The h-module 1000 is arranged to receive, at its input, the set of signature verification keys $SVK_1, \ldots, SVK_n$ instead of this set of signature verification keys being provided to the respective H-module 720, 900. The h-module 1000 uses its input to produce an intermediate value Z (which the chip set 402 may store for future use in a memory module 1010 of the chip set 402). The H modules 720, 900 then receive, as their input, the intermediate value Z (i.e. the value derived from the set of signature verification keys $SVK_1, \ldots, SVK_n$) and the virtual control word CW* and output a control word CW accordingly—in this sense, they operate in a similar manner to the H-module 432 of FIG. 4 (which has two inputs, one being a CW* and the other being a second value). The h-module 1000 may operate in exactly the same way as the H-module 720, 900 except that it does not receive a virtual control word CW* as its input. For example, the h-module 720 may merge the inputs $SVK_1, \ldots, SVK_n$ and may then apply a cryptographic hash function h to the merged inputs to produce the output Z. The function h may also be any other suitable cryptographic function (i.e. it need not necessarily be a hash function). Possible implementations of the function h preferably have the following property: given Z, it is hard (e.g., difficult, computationally difficult, infeasible or computationally infeasible) to find or calculate or determine a key pair (SK*, SVK*) and an input to h, such that the determined signature verification key SVK* is a signature verification key in the determined input to h, and such that Z is the output of h for this input (i.e. such that providing that input to function h, or as an input to the h-module 1000, would result in outputting the value Z). In certain embodiments, "hard" may mean that an adversary may not be able to derive such an input in polynomial time or space. In other embodiments, "hard" may be defined by specifying a lower bound on the number of operations or on the size of the memory required to find such an input. As a third example, one may define "hard" by specifying an upper-bound on the probability that the property is not satisfied. Possible ways of implementing the function h include the various ways of implementing the function H (as set out above).

In general, though, for these embodiments (that make use of the h-module 1000), the joint implementation of the function H and the function h preferably has the following property: given CW, it is hard (e.g., difficult, computationally difficult, infeasible or computationally infeasible) to find or calculate or determine a key pair (SK*, SVK*) and an input to the joint implementation of the function H and the function h, such that the determined signature verification key SVK* is a signature verification key in the determined input, and such that CW is the output of the joint implementation of the function H and the function h for this input. In certain embodiments, "hard" may mean that an adversary may not be able to derive such an input in polynomial time or space. In other embodiments, "hard" may be defined by specifying a lower bound on the number of operations or on the size of the memory required to find such an input. As a third example, one may define "hard" by specifying an upper-bound on the probability that the property is not satisfied.

Figure 13:
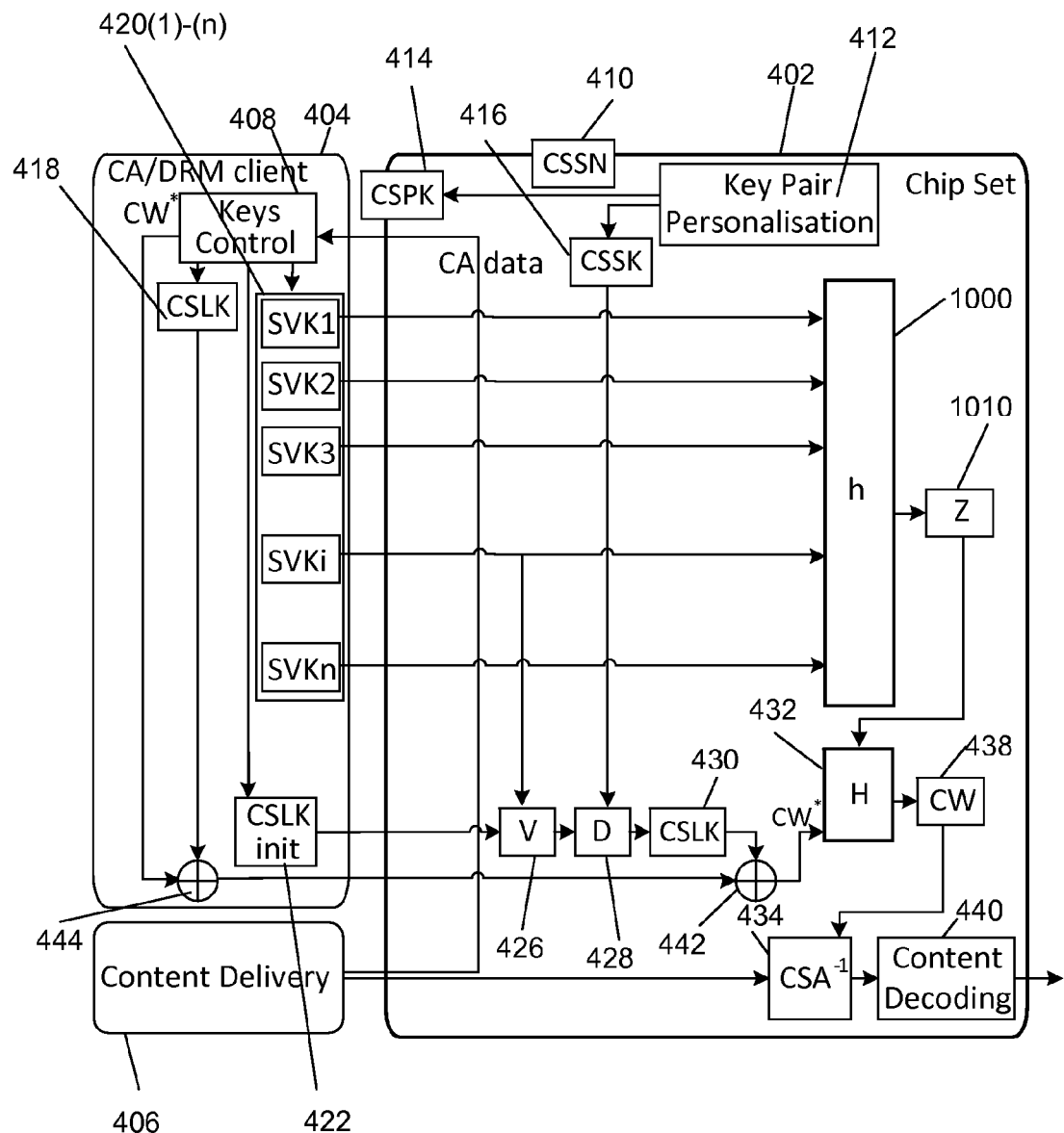
FIG. 13 schematically illustrates a variation of the chip set of FIG. 12.
Figure 14:
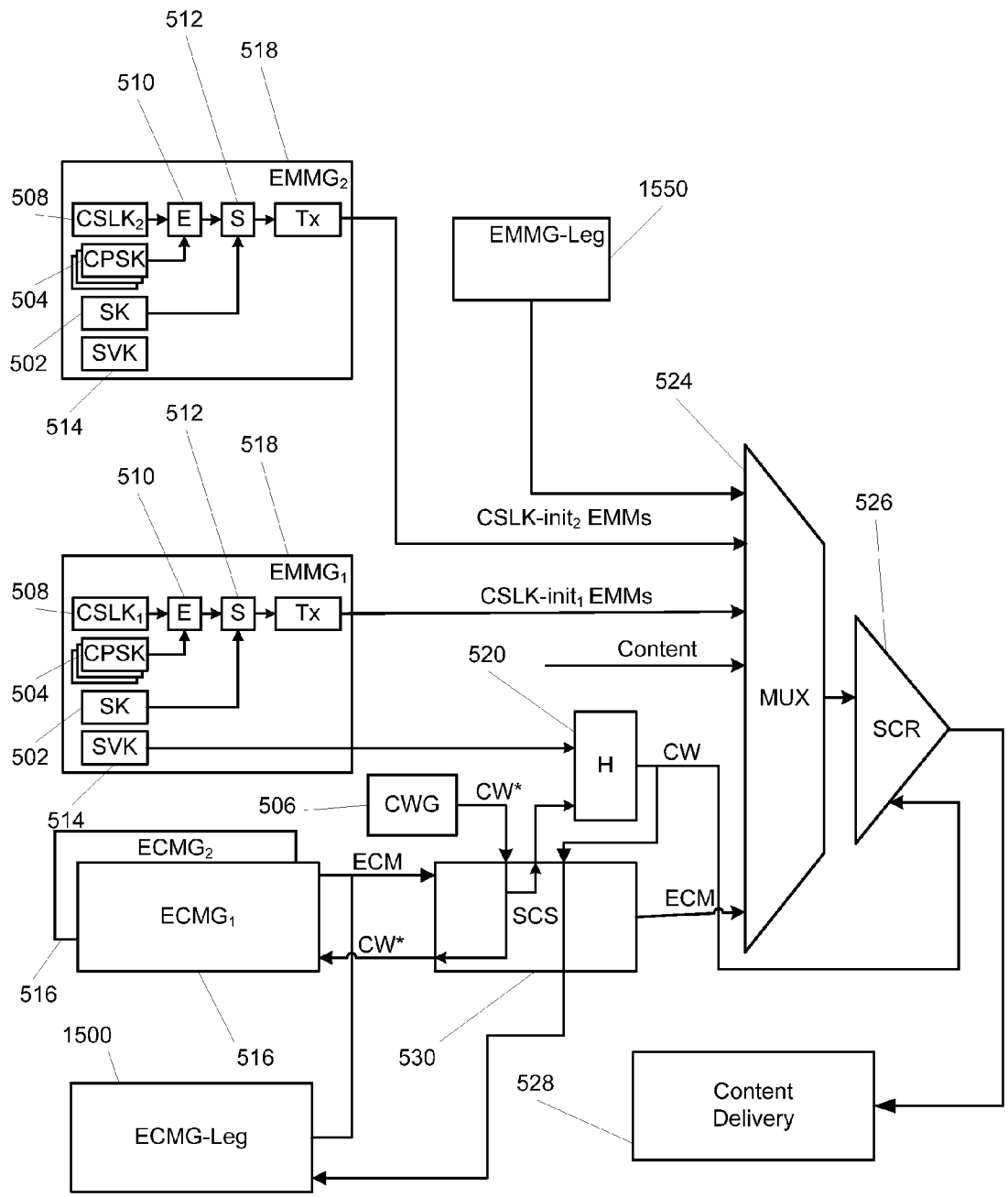
FIGS. 14-18 correspond to FIGS. 6, 7, 8, 10 and 11 respectively and include one or more legacy ECM generators and one or more legacy EMM generators.
Figure 15:
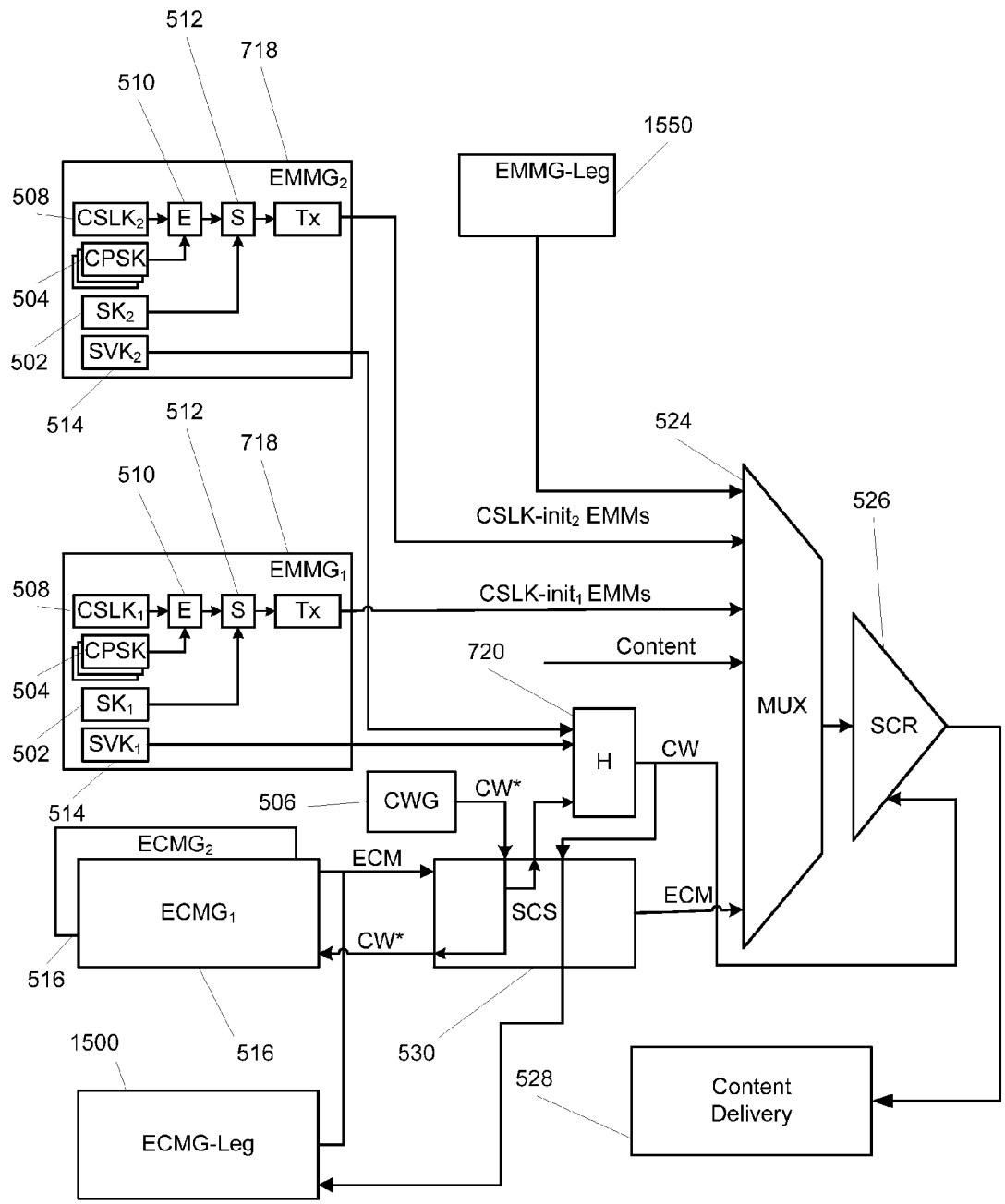
Figure 16:
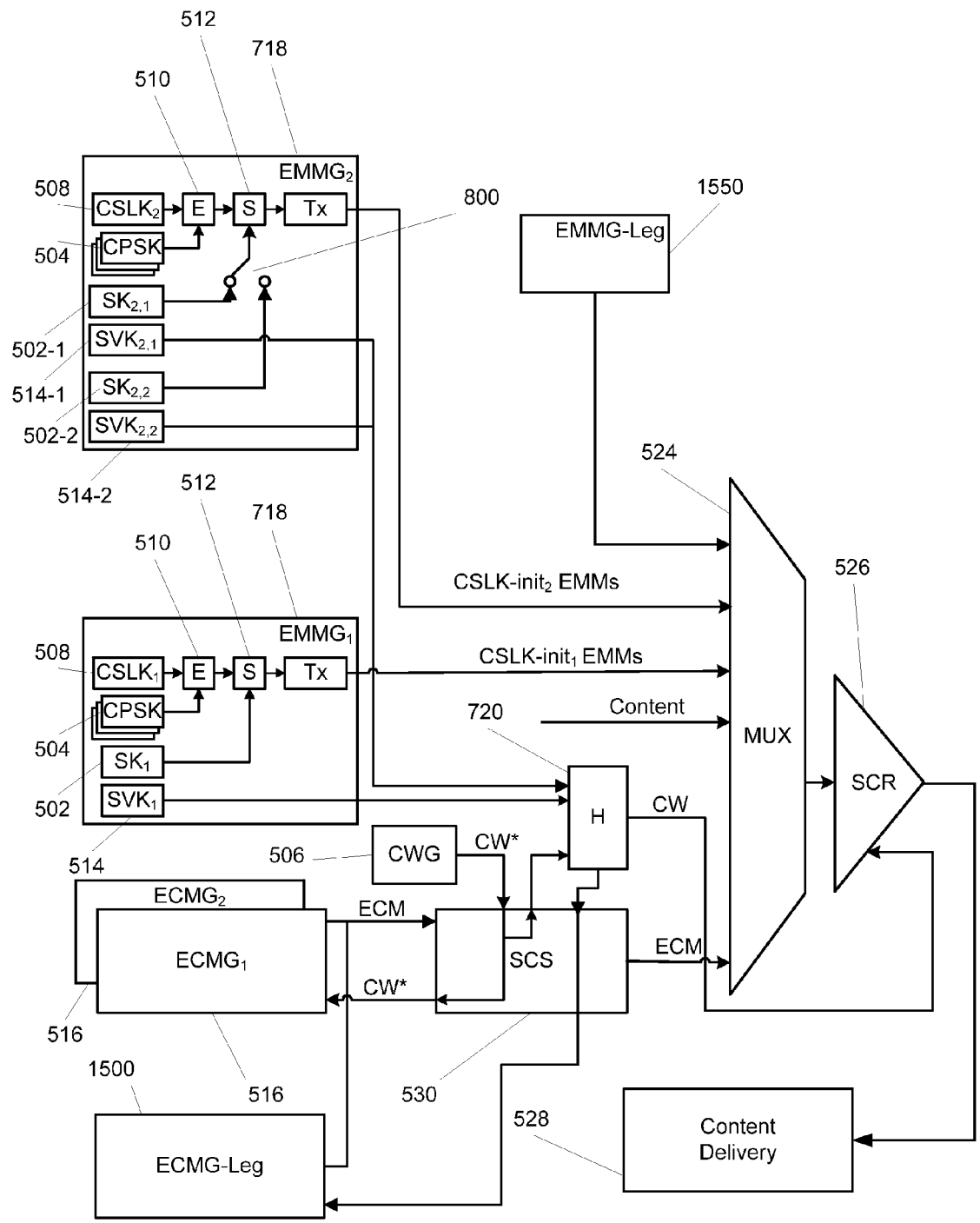
Figure 17:
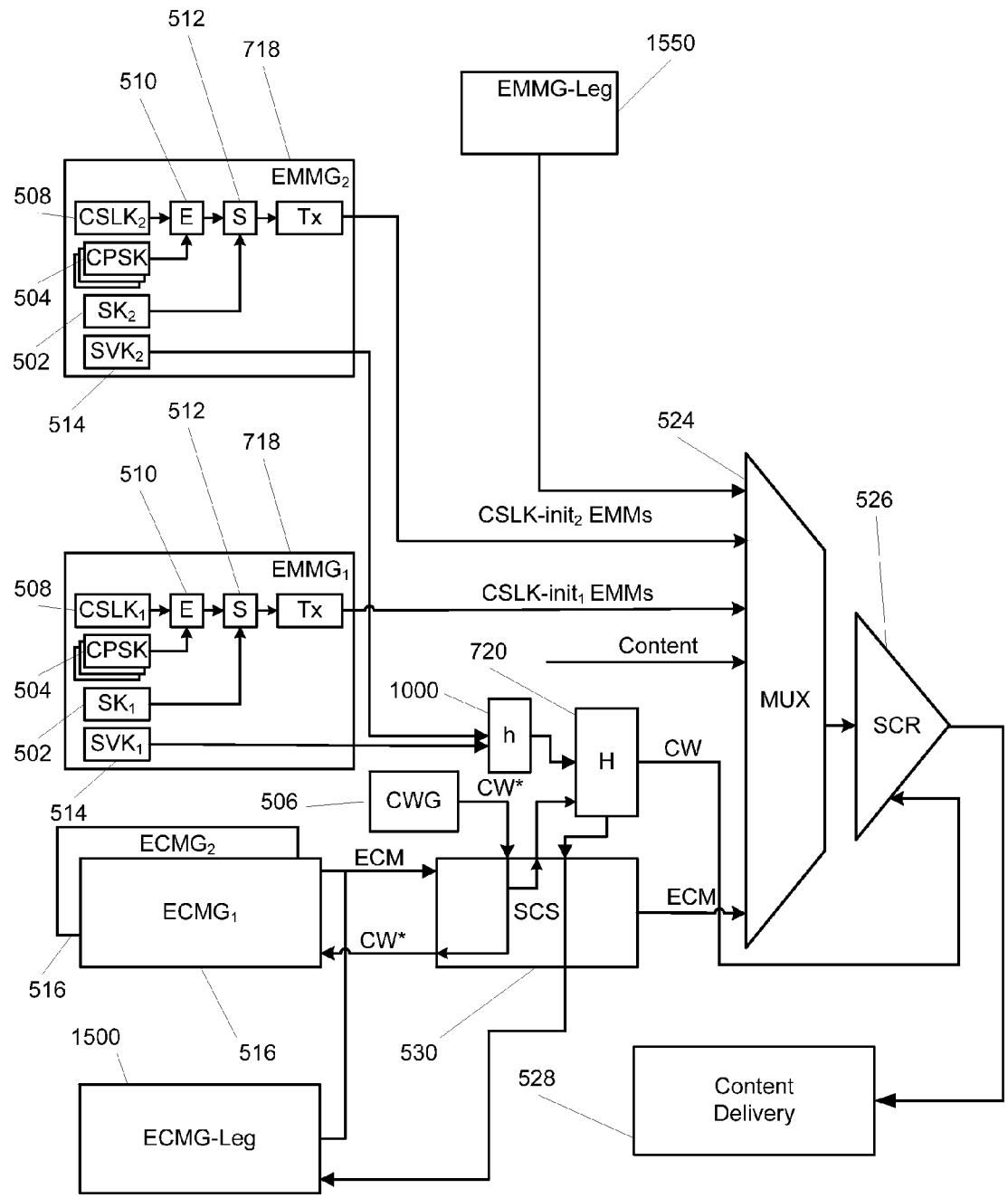
Figure 18:
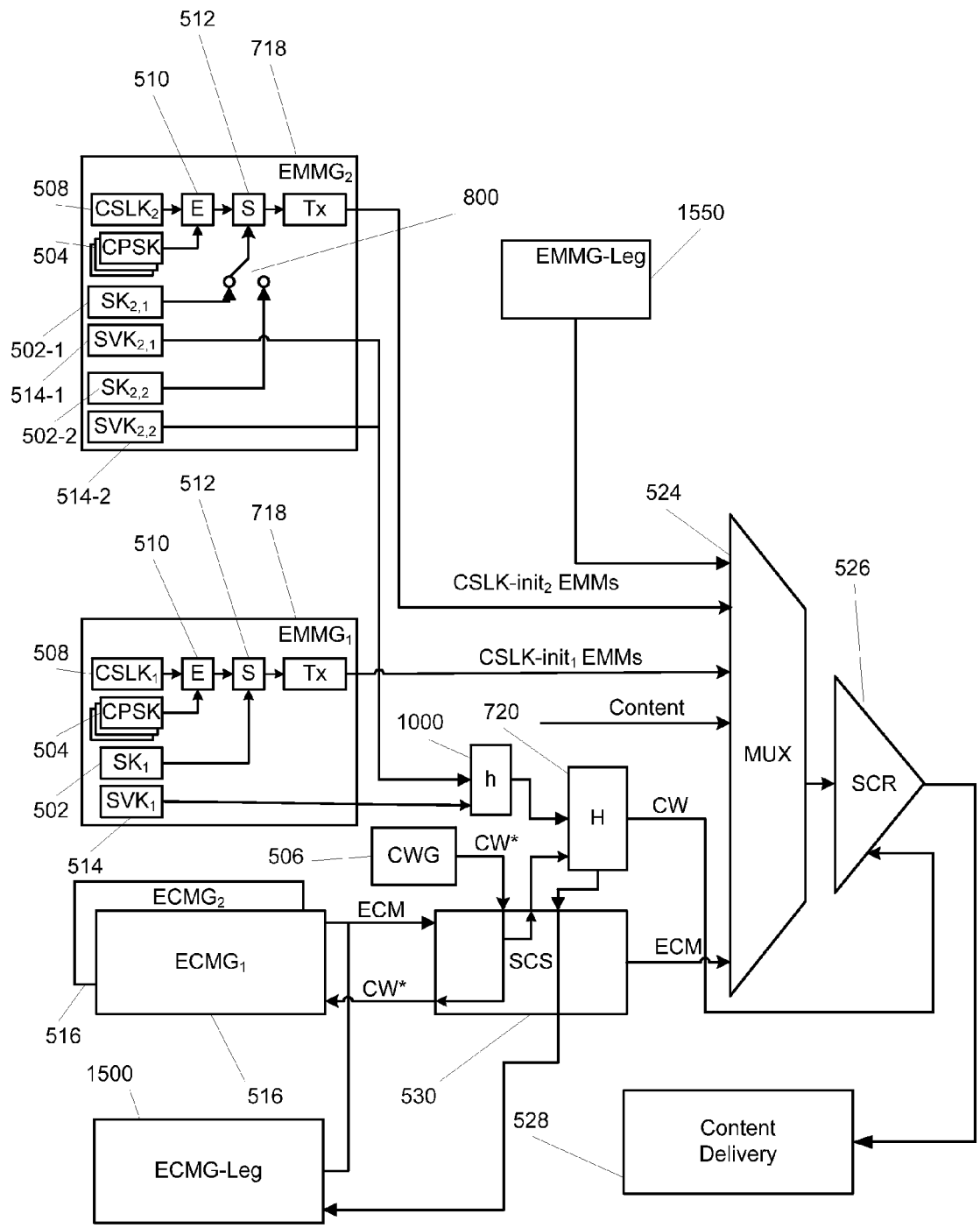

FIG. 13 schematically illustrates a variation of the chip set 402 of FIG. 12 in which the chip set 402 is not arranged to store the set of signature verification keys $SVK_1, \ldots, SVK_n$ for future use. Instead, the chip set 402 may simply store the output of the h-module 1000, i.e. the intermediate value Z, and use this intermediate value Z as an input to the H-module 900. In this way, the storage requirements of the chip set 402 can be reduced, as storing the intermediate value Z will generally require much less memory than storing the set of signature verification keys $SVK_1, \ldots, SVK_n$. In addition, performance for deriving CW from CW* and Z may be improved.

In some embodiments, after processing a CSLK-init message (received together with the associated signature verification key $SVK_i$), the chip set 402 computes a cryptographic hash value of the signature verification key $SVK_i$ (that it used to verify the authenticity of the CSLK-init pattern), and the chip set 402 stores this hash value together with CSLK. If a set of signature verification keys is provided to the chip set 402 (used as input to the h-module 1000, producing a value Z to be stored inside the chip set 402 for deriving control words), then the chip set 402 may compute the hash value of each signature verification key in the set, and use the computed hash values and the stored hash values (one stored hash value with every stored CSLK) to determine whether one or more of the stored CSLK(s) was(were) loaded using a key that is present in the set of received signature verification keys. As before, such a mechanism can be used to activate, deactivate or delete CSLK(s), based on the received set of signature verification keys.

In some embodiments, after the chip set 402 receives a set of signature verification keys $SVK_1, \ldots, SVK_n$, it computes a cryptographic hash value for each of these keys, and stores these values with the value of Z for future use. For example, if a CSLK-init message is received together with the associated signature verification key $SVK_i$, the chip set 402 can compute a cryptographic hash value of the signature verification key $SVK_i$. Next, the chip set compares the computed hash value with the stored hash values, and only processes the CSLK-init message if (at least) one of the stored hash values is equal to the computed hash value. In this way CSLK-init messages are only processed if $SVK_i$ is an element of the set of signature verification keys $SVK_1, \ldots, SVK_n$ used to produce the stored Z.

In some embodiments, a set of cryptographic hash values (comprising, for each key in the set of signature verification keys $SVK_1, \ldots, SVK_n$, a corresponding cryptographic hash value derived from that signature verification key) is provided to the function H (or the function h if present) instead of the set of signature verification keys $SVK_1, \ldots, SVK_n$. In such embodiments, the chip set 402 does not need to receive (or store) the set of signature verification keys; the chip set 402 only needs to receive the set of cryptographic hash values and the signature verification key associated with a CSLK-init message. The chip set 402 can compute the cryptographic hash value of the received signature verification key (received with the CSLK-init message), and compare this hash value with the cryptographic hash values in the received (or stored) set of cryptographic hash values to determine if the signature verification key provided with the CSLK-init message is associated with one of the signature verification keys in the set $SVK_1, \ldots, SVK_n$. In one embodiment, the CA/DRM (head-end) system can compute the set of cryptographic hash values. Next, the CA/DRM (head-end) system can send the set of cryptographic hash values to its CA/DRM clients. In such embodiments, the CA/DRM system only needs to provide the signature verification key(s) associated with that CA/DRM system to the CA/DRM clients associated with that CA/DRM system (to process CSLK-init messages associated with that CA/DRM system). Communication costs, storage costs and computation costs may be reduced in such embodiments. Alternatively, it may be the CA/DRM client that computes the set of cryptographic hash functions (having received the set of signature verification keys $SVK_1, \ldots, SVK_n$).

FIGS. 14-18 correspond to FIGS. 6, 7, 8, 10 and 11 respectively. However, in the systems shown in FIGS. 14-18, there is one or more legacy ECM generators 1500 and one or more legacy EMM generators 1550. The legacy ECM generators 1500 and the legacy EMM generators 1550 correspond to one or more CA/DRM systems associated with the head-end system 4 that do not make use of the methods described above for protecting the confidentiality and authenticity of control words (that is, these CA/DRM systems do not make use of CW*). Thus, the legacy ECM generators 1500 are arranged to receive the CW generated by the H-module 900 and generate ECMs based on the CW—this is in contrast to the ECM generators 516 which generate ECMs based on the virtual control word CW*. In the systems shown in FIGS. 14-18, the legacy ECM generators 1500 are arranged to receive the CW via the SimulCrypt synchronizer 530, but it will be appreciated that this is not essential. Similarly, the legacy EMM generators 1550 generate EMMs and provide those EMMs to the multiplexer 524—they do not provide an input to the H-module 900 or the h-module 1000.

In some embodiments, the output of the function H may include more than one value to be used in the content (de-)scrambling mechanism. For instance, the output of the H-module can consist of the virtual control word CW* and a second key derived from CW* and the set of keys $SVK_1, \ldots, SVK_n$ (or the value Z if h-module 1000 is used). These two derived keys can then be used in a super-scrambling solution where one key is used in a first scrambling step and the other key is used in a second scrambling step at the head-end system 4. The chip set 402 may be modified to perform two corresponding descrambling steps instead of one. In general, the output of the H-module may include multiple content (de-)scrambling keys that can be used in a super-scrambling solution consisting of multiple content (de-)scrambling steps. The output of the function H may also include more than one control word. Each of these control words can be used for (de-)scrambling an associated piece of content. For instance, the output of the H-module can consist of two control words. The first control word can be used for (de-)scrambling a first piece of content, and the second control word can be used for (de-scrambling) a second piece of content. In embodiments in which the output of the function H includes more than one value to be used in the content (de-)scrambling mechanism, possible implementations of the function H preferably have the following property: given an output Y, it is hard (e.g., difficult, computationally difficult, infeasible or computationally infeasible) to find or calculate or determine a key pair (SK*, SVK*) and an input to H, such that the determined signature verification key SVK* is a signature verification key in the determined input to H, and such that Y is the output of H for this input. (If the h-module 1000 is used, then the preferred property can be adapted as mentioned before). In addition, one may require that the preferred property of the function H holds independently for parts of the output, e.g., for all keys associated with one piece of content. Notice that this is a stronger property which is useful, but not strictly necessary, as the weaker property (i.e., the property described above on the output Y) already implies that the descrambling of at least one of the pieces of content associated with the output of H will fail.

In some embodiments, a first subset of the set of signature verification keys $SVK_1, \ldots, SVK_n$ (or hash values thereof) is provided to the function h, and the input of the function H comprises both the output of the function h and a second subset of the set of signature verification keys $SVK_1, \ldots, SVK_n$ (or hash values thereof). These two subsets may each comprise one or more (or all) of the signature verification keys $SVK_1, \ldots, SVK_n$. The union of these two subsets is the entire set of signature verification keys $SVK_1, \ldots, SVK_n$. These two subsets may or may not overlap.

In some embodiments, the (bit-)length of a virtual CW* may be larger than the (bit-)length of a CW, e.g. if the output of the H-module includes more than one control word.

In some embodiments, the function H and/or the function h may receive one or more additional inputs and generate their respective outputs based on those one or more additional inputs.

While generic public-key cryptography modules have been described and used in the above-mentioned embodiments, it will be appreciated that any other suitable cryptographic operations and infrastructure may be used as long as the authenticity and confidentiality of a CW loading message are provided. As an example, the authenticity mechanism may use a symmetric scheme in which both SK and SVK are secret keys. A well known example of such a system is RSA with a randomly selected encryption (or decryption) exponent, both of which are kept secret. If an authenticity mechanism is used in which SVK is a secret key, then preferably the SVK is transmitted in encrypted form to the chip set 402, e.g., using the chip set secret key CSSK of the associated chip set 402 as an encryption key. However, note that some of the advantages described in this disclosure do not apply if a symmetric authenticity mechanism is used. It may also be possible to insert additional key layers to the methods and systems described above, or to remove a key layer in the methods and systems described above.

Figure 19:
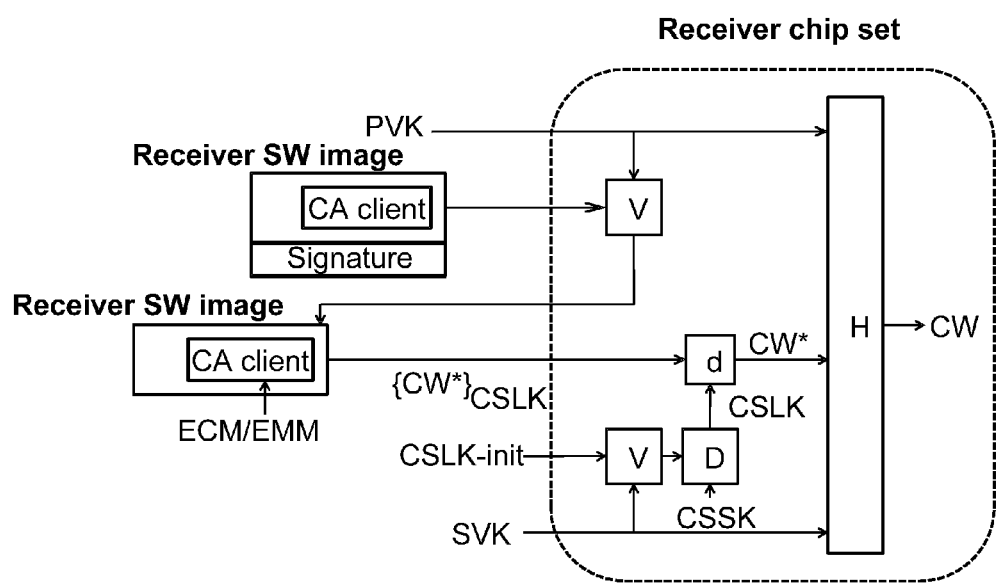
FIG. 19 is a schematic diagram depicting a downloadable receiver software image in accordance with an embodiment.

FIG. 19 is a schematic diagram depicting a downloadable receiver software (SW) image in accordance with an embodiment. In the example depicted in FIG. 19, it is assumed that the software image is not executed on the chip set, but on a separate chip or circuit integrated in the receiver.

In FIG. 19, it is assumed that content descrambling (not shown in FIG. 19) is also performed inside the receiver chip set, using CW as a content decryption key. Physical security measures may have been implemented to make the receiver chip set read-proof and tamper-resistant.

The channel between the CA/DRM client and the receiver chip set may be protected as detailed in European patent application EP10193312.5, the entire contents of which are incorporated herein by reference. However, in this embodiment the function H has an additional input. This additional input is a provider verification key PVK, associated with a mechanism used to protect the authenticity of the receiver software image. In FIG. 19, it is assumed without loss of generality that this key is a public key associated with an (asymmetric) digital signature scheme. The receiver software image may be identical for all receivers associated with a provider. Alternatively, a small number of different versions may exist. One example is if different types of receivers are deployed in the operation of the provider, each type requiring a different software image. Another example is the use of a small number of different CA/DRM client implementations that are functionally equivalent (also referred to as client diversification). Diversification is a well-known technique that aims at limiting the impact of certain security breaches. Associated to the provider public key PVK is a provider signing key PSK, used by the provider to sign a receiver software image (i.e. generate the signature of the software image and append it to the software image before distributing it to the receiver). To limit the amount of bandwidth required for distributing receiver software images (i.e. to limit the number of different receiver software images in a provider's population of receivers), personalization of an obfuscated CA/DRM client may be performed using the EMM channel.

The provider can generate the key pair (PSK, PVK) and may renew this key pair during the operational phase of the system, e.g. after a provider secret key PSK has been compromised. For example, the key pair (PSK, PVK) may be generated by the CA/DRM system in the head-end system of the provider. Alternatively, the provider may use another system to generate this key pair. In FIG. 19, it is assumed without loss of generality that the key pair (PSK, PVK) is associated with an (asymmetric) digital signature scheme. The secret key PSK does not need to be known to any CA/DRM system supplier.

After verifying the signature appended to the receiver software image, the receiver may execute the software. The output of the V module signals a valid or an invalid receiver software image. As will be appreciated, appropriate action should be taken to prevent a non-authentic software image from being effective. This could be external to the receiver chip set or could be handled within the receiver chip set (e.g. by blocking the loading of the PVK).

In particular, in some embodiments, the provider signs the receiver software image using the provider signature key PSK (and the associated signature generation algorithm) and the provider distributes the software image, the signature, and the corresponding PVK to the receiver. After receiving these three messages, the receiver uses the messages as input to the signature verification module V to verify the received signature. The output of the signature verification module V signals a valid or an invalid receiver software image. If the output signals an invalid receiver software image, then the receiver shall not execute the software image. In addition, the chip set may take further actions, such as not providing PVK as input to the function H. If the output signals a valid signature, then the receiver may execute the software image.

Typically, this verification process is executed every time after the receiver is switched on.

In addition to using PVK as a signature verification key, the chip set provides PVK as input to the function H. The function H protects the authenticity of PVK in that content descrambling will fail if PVK is not authentic. That is, if the verification key PVK* of a key pair (PSK*, PVK*), determined by an adversary not knowing the provider signature key PSK, is provided as input to the chip set (e.g. to execute an illegal receiver software image and descramble content), then the function H will not output the correct CW, and consequently, the content descrambling will fail.

Although a software image including a CA/DRM client is depicted in FIG. 19, the software can be any part of the software executed inside the receiver and does not necessarily include a CA/DRM client (e.g. the CA/DRM client may be implemented using a detachable smart card). If the CA/DRM client is included in the receiver software image, then preferably software obfuscation techniques are used to make the client read-proof and tamper-resistant. In the scheme shown in FIG. 19, personalization of a CA/DRM client may be performed using the EMM channel (to limit bandwidth usage).

In FIG. 19, the verification of the authenticity of the software is performed inside the receiver chip set. Different variants of this scheme exist. As an example, the receiver chip set may implement a mechanism to verify the authenticity of the receiver boot loader software. After verification, the boot loader software can be executed using another chip or circuit integrated in the receiver. The boot loader uses PVK to verify the authenticity of the receiver software and provides PVK to the chip set. Next, the receiver chip set uses PVK to derive CWs. It may also be possible to add more key layers for protecting the authenticity of the software image.

In some embodiments, PVK may be equal to SVK. In those embodiments, it is also possible to provide only one instance of this key as input to H (as in EP10193312.5). An advantage of using two different keys (i.e. key pairs) is the following. The systems in which the associated secret keys (i.e. SK and PSK) are stored and used may be different. If this is the case and if only one of these systems is compromised, then only one of the secret keys will be compromised, limiting the impact of the security breach. In general, using different keys implies that different key lifecycles can be used. For example, if the provider renews the key pair (SK, SVK) to revoke a compromised key or a compromised receiver chip set, then this has no impact on the protection and/or distribution of the receiver software images if an independent key pair (PSK, PVK) was used to protect their authenticity. If the key SK of a key pair (SK, SVK) is compromised, then this has no impact on the protection of the authenticity of receiver software images if an independent key pair (PSK, PVK) was used for this purpose.

If a symmetric scheme (e.g. a MAC) is used to protect the authenticity of the receiver software image, then both keys in the key pair (PSK, PVK) are secret and one key in the pair can be easily derived from the other key in the pair. Note that the provider can protect the confidentiality of PVK by encrypting it using CSPK and by distributing the resulting ciphertext to the receiver chip set.

Figure 20:
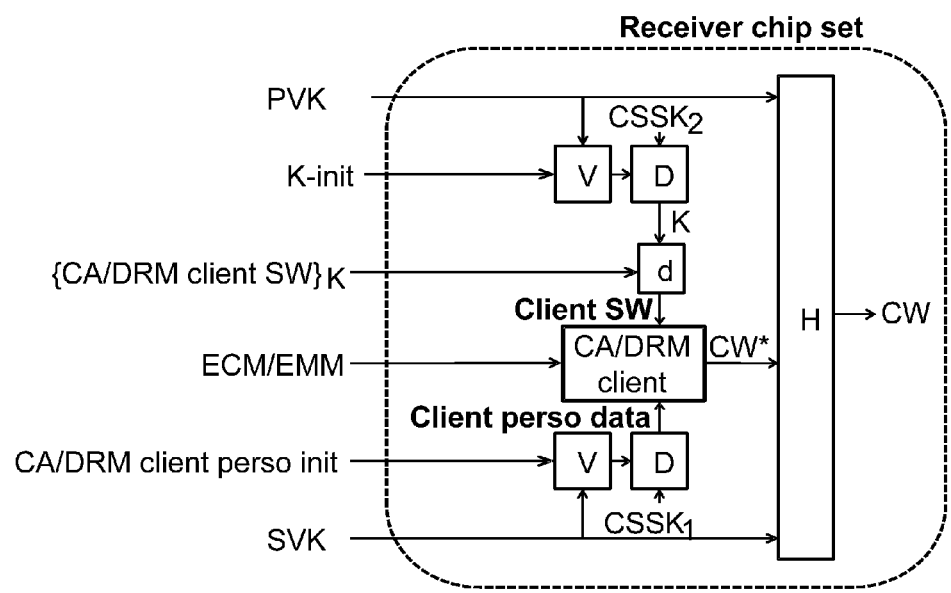
FIG. 20 is a schematic diagram depicting a downloadable receiver software image in accordance with another embodiment.

FIG. 20 depicts another embodiment. In this embodiment, the CA/DRM client is downloaded into the receiver chip set and executed inside the receiver chip set.

In the embodiment depicted in FIG. 20, it is assumed that the chip set secret keys $CSSK_1$ and $CSSK_2$ are associated with public-key encryption/decryption schemes and correspond to chip set public keys $CSPK_1$ and $CSPK_2$, respectively. The chip set manufacturer may make authentic copies of these public keys available to all providers. The keys $CSSK_1$ and $CSSK_2$ are loaded into the receiver chip set during its personalization phase (e.g. by the manufacturer of the receiver chip set). In some embodiments, $CSSK_1$ and $CSSK_2$ may be related. For example, the two key pairs ($CSSK_1$, $CSPK_1$) and ($CSSK_2$, $CSPK_2$) may be equal.

The provider generates authenticity key pairs (PSK, PVK) and (SK, SVK), each pair consisting of a provider signing key and a provider verification key. For example, such a key pair may be generated by the CA/DRM system in the head-end system of the provider. Alternatively, the provider may use another system to generate such a key pair. In FIG. 20, it is assumed without loss of generality that PVK and SVK are public keys associated with one or two (asymmetric) digital signature schemes. The secret keys of these key pairs do not need to be known to any CA/DRM system supplier.

To protect the authenticity of the verification keys PVK and SVK, these keys are provided as input to the function H. In certain embodiments, the key pairs (SK, SVK) and (PSK, PVK) are equal. In those embodiments, only one instance of the verification key may be provided as input to H. If a verification key is a secret key (that is, if a MAC is used), then the provider can protect its confidentiality by encrypting it with the public key $CSPK_1$ or $CSPK_2$ and distributing the resulting ciphertext to the receiver chip set. In FIG. 20, it is assumed without loss of generality that SVK and PVK are public keys associated with one or two (asymmetric) digital signature schemes.

In the embodiment shown in FIG. 20, the CA/DRM client software is encrypted using a symmetric encryption algorithm and a symmetric key K. The provider performs the generation of K and the encryption of the CA/DRM client software. The resulting ciphertext is denoted by $\{CA/DRM\ client\ SW\}_K$ in FIG. 20. Next, the provider distributes the encrypted CA/DRM client software to the receiver. In practice, a number of different versions of the CA/DRM client software may exist for one provider (e.g. if different types of chip sets are used in the operation of the provider, each type requiring a different CA/DRM client software image). Typically, each of these versions will be encrypted using a uniquely generated symmetric key K. The key K can be loaded into a receiver chip set using the techniques detailed in EP10193312.5 or EP11160417.9 the entire disclosures of which are incorporated herein by reference (and shown in FIG. 20). The message required for loading K into a receiver is referred to as K-init; this message is generated by the provider and is unique for every receiver chip set (as $CSSK_2$ is uniquely generated for every chip set). More precisely, to generate K-init, the provider may encrypts the key K using $CSPK_2$ and the associated public-key encryption algorithm and the provider may sign the resulting ciphertext using $PSK_2$ and the associated signature generation algorithm, producing K-init. Although it is also possible to protect the CA/DRM client software image directly by encrypting it with $CSPK_2$ and signing it with $PSK_2$ (observe that such a variant solution does not require the key K or the K-init message), a two key-layer architecture as in FIG. 20 uses less bandwidth and has a better decryption performance. To see this, note that the size of the K-init message (which is a unique message for each receiver) is small compared to the size of the CA/DRM client software image and that in the two-layer architecture only a few instances of the encrypted CA/DRM client software image (i.e. $\{CA/DRM\ client\ SW\}_K$) exist for the population of receivers associated with a provider (instead of a uniquely encrypted CA/DRM client software image for each receiver if the software image is encrypted using $CSPK_2$). Further, in general symmetric encryption/decryption primitives have a better performance than asymmetric primitives.

In some embodiments, only the authenticity of the CA/DRM client software image is protected. In those embodiments, a software verification mechanism similar to the software verification mechanism depicted in FIG. 19 can be used; the difference is that the CA/DRM client software is now stored an executed inside the receiver chip set after its authenticity is verified.

The CA/DRM client personalization data contains the master key (or master keys) of the CA/DRM client and is denoted by "CA/DRM client perso data" in FIG. 20. The size of the personalization data is small compared to the size of the CA/DRM client software image and this data is unique for every receiver. For these reasons, a single layer-key architecture can be used for protecting the (single source) authenticity and confidentiality of this data, as depicted in FIG. 20. For example, the provider may encrypt "CA/DRM client perso data" using $CSPK_1$ and the associated public-key encryption algorithm and the provider may sign the resulting ciphertext using $PSK_1$ and the associated signature generation algorithm, producing a "CA/DRM client perso init" message.

Next, the provider distributes $\{CA/DRM\ client\ SW\}_K$, K-init, "CA client perso init", $PVK_1$ and $PVK_2$ to the receiver (chip set).

After receiving these messages, the receiver chip set may use $PVK_2$ to verify the authenticity of K-init. If K-init is authentic, then the receiver chip set may derive the key K from K-init (using $CSSK_2$ as a decryption key). The receiver chip set may perform a similar process to derive the CA/DRM client personalization data from the received messages "CA/DRM client perso init" and $PVK_1$ (using $CSSK_1$ as a decryption key). These processes are detailed in EP10193312.5 or EP11160417.9 (the entire disclosures of which are incorporated herein by reference) and shown in FIG. 20. Next, the receiver chip set may use the key K to decrypt $\{CA/DRM\ client\ SW\}_K$, producing the CA/DRM client software.

After decrypting and merging the CA/DRM client software and the CA/DRM client personalization data, the CA/DRM client can be executed inside the receiver chip set, processing ECMs and EMMs.

The CA/DRM client may output CW* which is provided as input to the function H. The receiver chip set also provides the provider verification keys $PVK_1$ and $PVK_2$ as input to the function H to protect their authenticity. The output of the function H is a CW, which is used for descrambling content.

In certain embodiments, the key pairs ($PSK_1$, $PVK_1$) and ($PSK_2$, $PVK_2$) are equal. In those embodiments, only one instance of the verification key may be provided as input to H.

Software obfuscation techniques may be used to protect the implementation of the CA/DRM client software and the CA/DRM client personalization data further. Such techniques may also be used to protect the implementation of one or more of the other primitives implemented inside the receiver chip set. It may be possible to add more key layers for protecting the authenticity and confidentiality of the CA/DRM client software and/or the CA/DRM client personalization data.

If a provider verification key is a secret key (that is, if a MAC is used), then the provider can protect its confidentiality by encrypting it with the public key $CSPK_1$ or $CSPK_2$ and by distributing the resulting ciphertext to the chip set.

Figure 21:
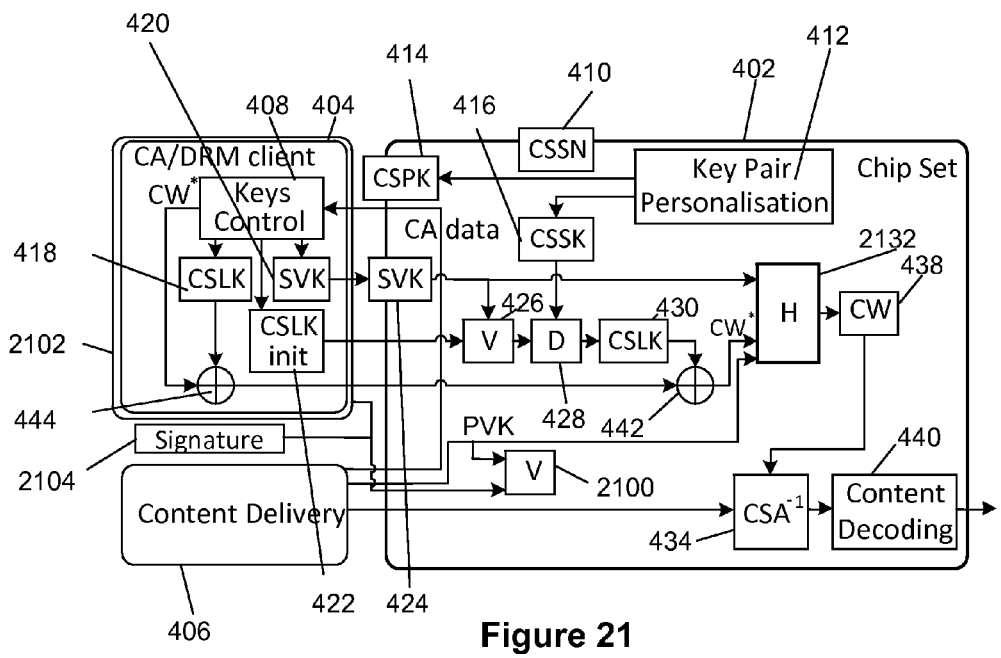
FIG. 21 schematically illustrates an example method of using a chip set together with downloadable receiver software images, according to an embodiment.
Figure 22:
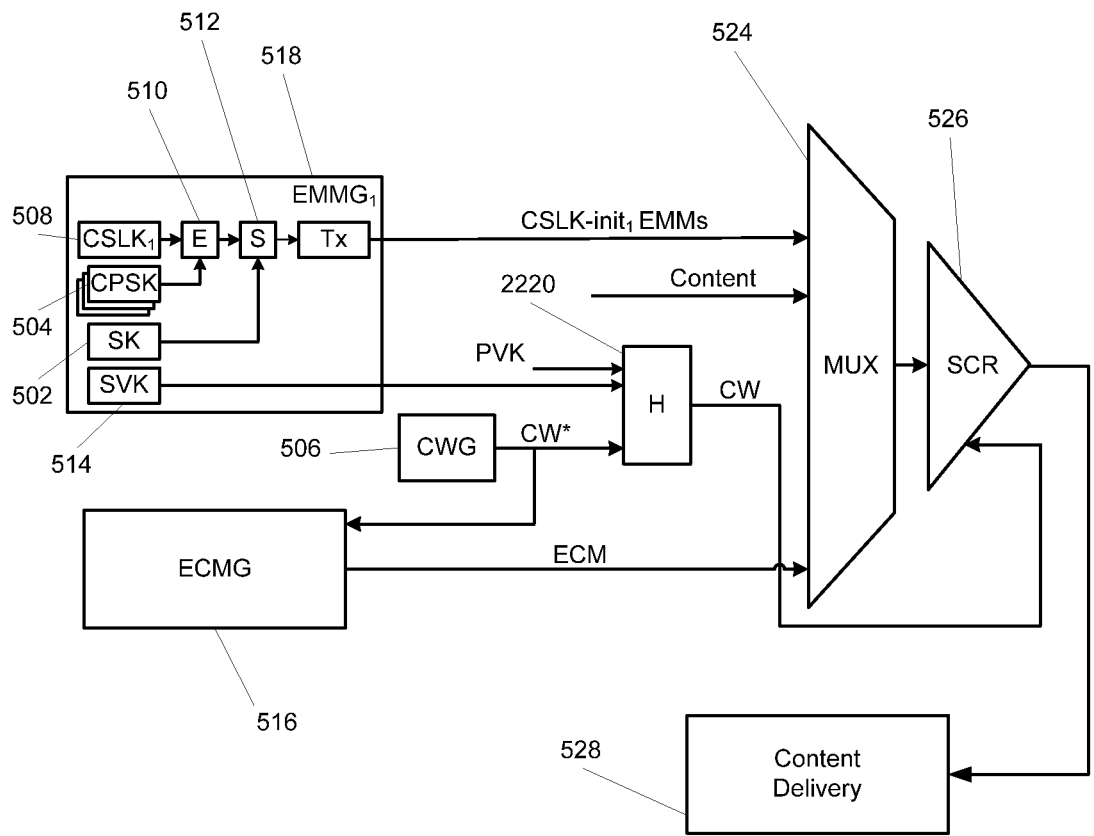
FIG. 22 schematically illustrates a method for use in a head-end system of a content delivery network together with uploadable receiver software images according to an embodiment.

The application of the principles described above with reference to FIG. 19 are illustrated in FIGS. 21 and 22. In particular, FIG. 21 illustrates the same arrangement as shown in FIG. 4, except that receiver software image (including a CA/DRM client) authentication is provided for in FIG. 21; and FIG. 22 illustrates the same arrangement as shown in FIG. 5, except that receiver software image authentication is provided for in FIG. 22 (the process of signing receiver software images is not shown in FIG. 22). It will be appreciated that the application of the principles described above with reference to FIG. 20 can be applied analogously to FIGS. 21 and 22 and they shall, therefore, not be described in detail herein (although the same modifications to the H-functions, as set out below, would be implemented).

In embodiments, the software image is a CA/DRM client (consisting of CA/DRM client software and CA/DRM client personalization data).

In FIG. 21, it is assumed that the receiver software image (including the CA/DRM client software 404) is not executed on the chip set, but on a separate chip or circuit integrated in the receiver—however, it will be appreciated that this need not be the case for other embodiments.

In FIG. 21, the chip set 402 further comprises a verification module 2100. The verification module 2100 is arranged to receive a provider verification key PVK as distributed to the receiver by the provider (e.g., PVK may have been distributed together with a software image 2102 and/or a digital signature 2104, or may provided as separate CA data). The verification module 2100 is also arranged to receive the software image 2102 (which includes the CA/DRM client software 404) and the digital signature 2104 of the software image 2102. As mentioned above, the digital signature 2104 of the software image 2102 is generated by the provider using a provider signature key PSK corresponding to the provider verification key PVK. The verification module 2100 is arranged to use the received provider verification key PVK to verify the digital signature 2104 that it receives as an input against the software image 2102 that it receives as an input (using signature verification techniques as are well-known to the skilled person).

If the verification module 2100 determines that the signature that it received as an input does not correspond to the software image that it received as an input (the verification being based on the received provider verification key PVK), then a first stage of authentication of the software image 2102 has failed. In this case, the receiver or chip set 402 may follow a number of options, such as not completing a boot-up or no longer carrying out any content descrambling or decoding.

If the verification module 2100 determines that the signature that it received as an input does correspond to the software image that it received as an input (the verification being based on the received provider verification key PVK), then the first stage of authentication of the software image 2102 has been passed. If this occurs, then the receiver may access (or execute) the software image (including the CA/DRM client software 404) so that the CA/DRM client functionality can then be utilized (as set out above to obtain virtual descrambling information, namely CW* and SVK). However, the described first stage of authentication of the software image 2102 is not the complete verification of the source (or single source) of the software image 2102, as set out below.

In particular, chip set 402 illustrated in FIG. 21 comprises an H-module 2132 in place of the H-module 432 of FIG. 4. The H-module 2132 is the same as the H-module 432 of FIG. 4 except that it also provided with (i.e. receives), as an input, the provider verification key PVK (i.e. in addition to the virtual descrambling information of CW and SVK). Thus the provider verification key PVK is used both for verifying the digital signature 2104 (or the single source authenticity) of the software image 2102 and as an input to the H-module 2132 to generate the control words 438.

In a similar vein, the system illustrated in FIG. 22 makes use of an H-module 2220 in place of the H-module 520 of FIG. 5. The H-module 2220 is the same as the H-module 520 of FIG. 5, except that it is arranged to receive, as an input, the verification key PVK of the provider. Thus, the control word CW generated by the H-module 2220 in FIG. 22, and which is used to scramble the content, will only be reproducible by the chip set 402 in FIG. 21 if the H-module 2132 in FIG. 21 also receives, as a input, the same provider verification key PVK as used by the H-module 2220.

As discussed above, the H-modules 432 and 520 (and therefore the H-modules 2132 and 2220 too) make use of a function H. The H-modules 2132 and 2220 may merge their three inputs (PVK, CW* and SVK) before applying the hash function to the merged inputs to produce the output CW. The function H may also be any other suitable cryptographic function (i.e. it need not necessarily be a hash function). Possible implementations of the function H preferably have the following property: given an output CW, it is hard (e.g., difficult, computationally difficult, infeasible or computationally infeasible) to find a key pair (PSK*, PVK*) and descrambling information (such as an SVK* of a key pair (SK*, SVK*) and a virtual control word CW**) such that PVK* and the descrambling information map to CW. If this property is satisfied, then an adversary cannot descramble content using an illegal (or unauthorized or illegitimate) software image, even if SVK* is a key of a key pair (SK*, SVK*) and if SK* is known to the adversary. In certain embodiments, "hard" may mean that an adversary may not be able to derive the above information in polynomial time or space. In other embodiments, "hard" may be defined by specifying a lower bound on the number of operations or on the size of the memory required to find such values. As a third example, one may define "hard" by specifying an upper-bound on the probability that the property is not satisfied.

An example of a function H with this property is the following: (1) merge the inputs CW*, SVK and PVK to produce an intermediate result X, e.g., by concatenating these values, (2) apply a $2^{nd}$ pre-image resistant hash function to the input X to produce the output CW. The analysis provided above when discussing the function H that accepts only a single SVK applies analogously to this modified function H that accepts a larger set of verification keys.

It will be appreciated that the systems described above with reference to FIGS. 6-18 may be amended analogously, so that their respective H-modules also receive as an input, and generate a control word in dependence upon, the provider verification key PVK. This may be either as direct inputs to the H-module or via an intermediate h-module (as used in the systems of FIGS. 10-13, 17 and 18). Similarly, it will be appreciated that the H-modules described above with reference to FIGS. 19-22 need not necessarily be arranged to receive, as an input, SVK (so that control word authenticity is not verified, but the software image authenticity is verified).

In some embodiments, the provider verification key PVK may be equal to SVK. In some embodiments, the provider computes a (cryptographic) hash value of each different type of receiver software image in the population of receivers that it services and provides the set of computed hash values as input to the H-module 2220 (instead of providing the provider verification key PVK as input to the H-module 2220). Next, the provider distributes the receiver software images and the set of hash values to the receivers that it services. Each receiver provides its receiver software image and the hash values of the other receiver software images as inputs to its chip set. The chip set computes the hash value of its receiver software image and provides the set of hash values (comprising of the computed hash value and the received hash values of the other receiver software images) as input to the H-module 2132. The H-module protects the authenticity of the hash values in that descrambling will fail if the sets of hash values provided as inputs to the H-modules 2220 and 2132 are different. Observe that in such embodiments the key pair (PSK, PVK) is not required.

The described methods for protecting the authenticity of a receiver software image have the desired properties. In particular, a provider signature key does not to be known to any CA/DRM supplier and no secret keys associated with the receiver need to be managed by a trusted party after its personalization is completed (as a chip set secret key can be deleted after the chip set is personalized).

In addition, the new methods for protecting the authenticity of a receiver software image can recover from a security breach in which the root key pair of the software authenticity mechanism is compromised, a security feature not offered by existing solutions.

The various symmetric and asymmetric encryption/decryption modules and schemes mentioned above may make use of any symmetric or asymmetric encryption/decryption algorithms currently known or devised in the future. Similarly, the various signature generation and verification modules and schemes mentioned above may make use of any signature generation and verification algorithms currently known or devised in the future.

It will be appreciated that embodiments may be implemented using a variety of different information processing systems. In particular, although the Figures and the discussions thereof provide exemplary computer architectures, these are presented merely to provide a useful reference in discussing various embodiments. Of course, the description of the architecture has been simplified for purposes of discussion, and it is just one of many different types of computer architectures that may be used for embodiments. It will be appreciated that the boundaries between logic blocks are merely illustrative and that alternative embodiments may merge logic blocks or elements, or may impose an alternate decomposition of functionality upon various logic blocks or elements.

It will be appreciated that, insofar as embodiments are implemented by a computer program, then a non-transitory storage medium and a transmission medium carrying the computer program form embodiments. The computer program may have one or more program instructions, or program code, which, when executed by a computer processor carries out the embodiments. The term "program," as used herein, may be a sequence of instructions designed for execution on a computer system, and may include a subroutine, a function, a procedure, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method implemented by one or more processors, for obtaining descrambling information at a receiver, the descrambling information for enabling descrambling of scrambled content, the method comprising:
   using a provider verification key to access a software image, said software image having been secured by a provider using a provider signature key corresponding to the provider verification key;
   receiving a secured version of virtual descrambling information;
   using the accessed software image to obtain the virtual descrambling information from the secured version of the virtual descrambling information;
   providing the virtual descrambling information and said provider verification key as inputs to a cryptographic function to produce a given output comprising said descrambling information, wherein the cryptographic function has the property that it is infeasible to determine a key pair including a signature key and a verification key associated with the signature key, and another virtual descrambling information, such that the determined verification key and the another virtual descrambling information map to the given output of the cryptographic function.

2. The method of claim 1 in which accessing the software image comprises verifying and/or authenticating said software image.

3. The method of claim 1 in which the software image is encrypted and in which accessing the software image comprises:
   verifying and/or authenticating a decryption key for decrypting the encrypted software image; and
   using the verified and/or authenticated decryption key to decrypt the software image.

4. The method of claim 1, in which:
   the secured version of the virtual descrambling information is the virtual descrambling information secured by a provider using a second provider signature key;
   using the software image to obtain virtual descrambling information from the secured version of the virtual descrambling information comprises using a second provider verification key corresponding to the second provider signature key to access the secured version of the virtual descrambling information; and
   said providing comprises providing the virtual descrambling information, said provider verification key and said second provider verification key as inputs to a cryptographic function to produce a given output comprising said descrambling information, wherein the cryptographic function has the property that it is infeasible to determine a first key pair including a first signature key and a first verification key associated with the first signature key, a second key pair including a second signature key and a second verification key and another virtual descrambling information, such that the determined first verification key, the determined second verification key and the another virtual descrambling information map to the given output of the cryptographic function.

5. The method of claim 4, in which the second provider verification key equals the provider verification key.

6. The method of claim 1, in which a provider verification key and a provider signature key are, respectively, a public key and a private key for a digital signature scheme.

7. The method of claim 1, in which a provider verification key and a provider signature key are keys for a symmetric message authentication scheme.

8. A method implemented by one or more processors, for enabling a receiver to obtain descrambling information, the descrambling information for enabling descrambling of scrambled content, the method comprising:
   providing to the receiver a provider verification key and a software image, said software image having been secured by a provider using a provider signature key corresponding to the provider verification key, said provider verification key for accessing said software image;
   providing to the receiver a secured version of the virtual descrambling information, wherein said software image is arranged to obtain the virtual descrambling information from the secured version of the virtual descrambling information,
   wherein said receiver is arranged to execute a cryptographic function, wherein provision of the virtual descrambling information and said provider verification key as inputs to a cryptographic function produce a given output comprising said descrambling information, wherein the cryptographic function has the property that it is infeasible to determine a key pair including a signature key and a verification key associated with the signature key, and another virtual descrambling information, such that the determined verification key and the another virtual descrambling information map to the given output of the cryptographic function.

9. An apparatus for obtaining descrambling information at a receiver, the descrambling information for enabling descrambling of scrambled content, the apparatus comprising one or more processors arranged to:
   use a provider verification key to access a software image, said software image having been secured by a provider using a provider signature key corresponding to the provider verification key;
   receive a secured version of virtual descrambling information;
   use the accessed software image to obtain the virtual descrambling information from the secured version of the virtual descrambling information;
   provide the virtual descrambling information and said provider verification key as inputs to a cryptographic function to produce a given output comprising said descrambling information, wherein the cryptographic function has the property that it is infeasible to determine a key pair including a signature key and a verification key associated with the signature key, and another virtual descrambling information, such that the determined verification key and the another virtual descrambling information map to the given output of the cryptographic function.

10. An apparatus according to claim 9, in which the apparatus is a smart card or a chip set of a receiver.

11. An apparatus for enabling a receiver to obtain descrambling information, the descrambling information for enabling descrambling of scrambled content, the apparatus comprising one or more processors arranged to:
   provide to the receiver a provider verification key and a software image, said software image having been secured by a provider using a provider signature key corresponding to the provider verification key, said provider verification key for accessing said software image;
   provide to the receiver a secured version of virtual descrambling information, wherein said software image is arranged to obtain the virtual descrambling information from the secured version of the virtual descrambling information,
   wherein said receiver is arranged to execute a cryptographic function, wherein provision of the virtual descrambling information and said provider verification key as inputs to a cryptographic function produce a given output comprising said descrambling information, wherein the cryptographic function has the property that it is infeasible to determine a key pair including a signature key and a verification key associated with the signature key, and another virtual descrambling information, such that the determined verification key and the another virtual descrambling information map to the given output of the cryptographic function.

12. An apparatus according to claim 11, in which the apparatus is a head-end system of a content delivery network.

13. A non-transitory computer readable medium having instructions stored thereon for causing at least one processor to obtain descrambling information at a receiver, the descrambling information for enabling descrambling of scrambled content, the instructions, when executed by the at least one processor, arranged to cause the at least one processor to:
   use a provider verification key to access a software image, said software image having been secured by a provider using a provider signature key corresponding to the provider verification key;
   receive a secured version of virtual descrambling information;
   use the accessed software image to obtain the virtual descrambling information from the secured version of the virtual descrambling information;
   provide the virtual descrambling information and said provider verification key as inputs to a cryptographic function to produce a given output comprising said descrambling information, wherein the cryptographic function has the property that it is infeasible to determine a key pair including a signature key and a verification key associated with the signature key, and another virtual descrambling information, such that the determined verification key and the another virtual descrambling information map to the given output of the cryptographic function.

14. A non-transitory computer readable medium having instructions stored thereon for enabling a receiver to obtain descrambling information, the descrambling information for enabling descrambling of scrambled content, the instructions, when executed by the at least one processor, arranged to cause the at least one processor to:
   provide to the receiver a provider verification key and a software image, said software image having been secured by a provider using a provider signature key corresponding to the provider verification key, said provider verification key for accessing said software image;
   provide to the receiver a secured version of virtual descrambling information, wherein said software image is arranged to obtain the virtual descrambling information from the secured version of the virtual descrambling information,
   wherein said receiver is arranged to execute a cryptographic function, wherein provision of the virtual descrambling information and said provider verification key as inputs to a cryptographic function produce a given output comprising said descrambling information, wherein the cryptographic function has the property that it is infeasible to determine a key pair including a signature key and a verification key associated with the signature key, and another virtual descrambling information, such that the determined verification key and the another virtual descrambling information map to the given output of the cryptographic function.

* * * * *